United States Patent

Yu

Patent Number: 5,876,303
Date of Patent: Mar. 2, 1999

[54] HYDRAULIC CONTROL SYSTEM FOR AUTOMATIC TRANSMISSIONS

[75] Inventor: Pyunghwan Yu, Kyungki-do, Rep. of Korea

[73] Assignee: Hyundai Motor Company, Seoul, Rep. of Korea

[21] Appl. No.: 919,615

[22] Filed: Aug. 28, 1997

[30] Foreign Application Priority Data

Aug. 30, 1996 [KR] Rep. of Korea ............... 1996/36923

[51] Int. Cl.$^6$ ............................. F16H 61/00
[52] U.S. Cl. ................. 477/116; 477/117; 477/131; 477/130
[58] Field of Search ....................... 477/116, 117, 477/130, 131

[56] References Cited

U.S. PATENT DOCUMENTS

| | | | |
|---|---|---|---|
| 5,507,706 | 4/1996 | Jang et al. | 477/130 |
| 5,655,994 | 8/1997 | Jang et al. | 477/117 |
| 5,658,218 | 8/1997 | Jang et al. | 477/117 |
| 5,697,865 | 12/1997 | Jang et al. | 477/130 |

*Primary Examiner*—Khoi Q. Ta
*Assistant Examiner*—Brandon C. Stallman

[57] ABSTRACT

Disclosed is a hydraulic control system. The system includes an oil pump; a pressure regulator valve; a torque converter which converts engine power to torque; a converter clutch regulator valve; a solenoid supply valve; a manual valve which is indexed by a selector lever; a torque control regulator valve for supplying drive pressure from the manual valve to friction elements in each shift stage; first, second, third, fourth, fifth, sixth, seventh, eighth, and ninth friction elements, one or more of which are operated to control each stage; a control switch valve; 1-2, 2-3, 3-4, and 4-5 shift valves receiving torque pressure or line pressure and selectively supplying drive pressure from the manual valve to the friction elements; second and third clutch valves, a fourth band valve, and an overdrive unit valve controlled by torque pressure and which supply drive pressure to the friction elements and drive pressure of a subsequent shift stage to the shift valves; and a N-D control valve which receives line pressure, drive pressure, and torque pressure to control the first friction element using line pressure in a neutral N range, the first friction element using torque pressure and the third friction element using first torque pressure then drive pressure when shifting from the neutral N range to a drive D range.

37 Claims, 13 Drawing Sheets

5,876,303

HYDRAULIC CONTROL SYSTEM FOR AUTOMATIC TRANSMISSIONS

FIELD OF THE INVENTION

The present invention relates to a hydraulic control system for automatic transmissions, and more particularly, to a hydraulic control system for automatic transmissions which, when N to D shifting or shifting into a low L range, controls an operated friction element using torque pressure and allows other friction elements to be controlled first by torque pressure then by drive pressure such that the precision and responsiveness of friction element control are improved.

BACKGROUND OF THE INVENTION

Generally, an automatic transmission for vehicles includes a torque converter which is a fluid link between an engine and the transmission acting as both a torque multiplier and fluid coupling, a multi-stage gear shift mechanism connected to the torque converter, and a plurality of friction elements actuated by hydraulic pressure and which select and control one gear stage of the gear shift mechanism depending on road load and engine throttle opening of the vehicle.

The friction elements are provided enabling control of each gear stage of the multi-stage gear shift mechanism, comprised of a planetary gearset, and the friction elements are selectively activated/deactivated by the hydraulic control system which controls the hydraulic pressure generated by an oil pump, and, as a result, shift ratios of the planetary gearsets are changed to realize automatic shifting.

Also, the friction elements are selectively operated by the changing of hydraulic pressure directional flow by a plurality of valves provided in the hydraulic control system. A position of a manual valve is indexed with a driver selector lever position to realize port conversion, receives hydraulic pressure from the oil pump, and communicates with a line to supply the hydraulic pressure to a shift control valve.

The above hydraulic control system for automatic transmissions includes first to fourth shift mechanisms and first to ninth friction elements. A plurality of shift ranges can be realized by selectively operating the friction elements.

However, with the conventional hydraulic control system, because line pressure is reduced during N to D control, and shifting into the low L range is done mechanically, operational pressure of the operating friction element is reduced and the friction element slips such that control precision and responsiveness of the friction element is reduced.

SUMMARY OF THE INVENTION

The present invention has been made in an effort to solve the above problems.

It is an object of the present invention to provide a hydraulic control system for automatic transmissions which, when N to D shifting or shifting into a low L range, controls an operated friction element using torque pressure and allows other friction elements to be controlled first by torque pressure then by drive pressure such that the precision and responsiveness of friction element control are improved.

To achieve the above object, the present invention provides a hydraulic control system for automatic transmissions including an oil pump including a drive gear rotating together with an engine and a driven gear meshed and rotating with the drive gear; a pressure regulator valve receiving hydraulic pressure from the oil pump and which varies the hydraulic pressure to suitable levels for forward and reverse driving; a torque converter mounted between a crankshaft of an engine and a transmission and which converts engine power to torque; a converter clutch regulator valve supplying converter clutch operational pressure through a converter feed valve to increase power transmission efficiency of the torque converter; a solenoid supply valve receiving line pressure from the pressure regulator valve to reduce the line pressure to solenoid supply pressure and supplying the same to first, second, third, fourth, fifth, sixth, and seventh solenoid valves; a manual valve a position of which is indexed by a selector lever and which converts the line pressure from the pressure regulator valve to drive pressure; a torque control regulator valve for converting and supplying the drive pressure from the manual valve to friction elements in each shift stage; first, second, third, fourth, fifth, sixth, seventh, eighth, and ninth friction elements, one or more of which are operated to control each stage of a multi-stage gearshift mechanism; a control switch valve for determining where the torque pressure supplied from the torque control regulator valve will be supplied; 1-2, 2-3, 3-4, and 4-5 shift valves receiving torque pressure from the torque control regulator valve or line pressure from the pressure regulator valve by the ON/OFF control of the first, second, third, and fourth solenoid valves, and selectively supplying drive pressure from the manual valve to the friction elements to realize shifting; second and third clutch valves, a fourth band valve, and an overdrive unit valve controlled by torque pressure from the torque control regulator valve and which supply drive pressure to friction elements in each shift range, and, also, supply drive pressure of a subsequent shift stage to the shift valves; and a N-D control valve which receives line pressure from the pressure regulator valve, drive pressure from the manual valve, and torque pressure from the torque control regulator valve to control the first friction element using line pressure in a neutral N range, the first friction element using torque pressure and the third friction element using first torque pressure then drive pressure when shifting from the neutral N range to a drive D range.

The ninth friction element is a reverse friction element connected to the manual valve via a reverse pressure line to receive reverse drive pressure from the manual valve.

A reverse clutch inhibitor valve is provided on the reverse pressure line to prevent reversing of a vehicle by stopping oil flow to the ninth friction element when shifting to a reverse R range from the drive D range.

The manual valve includes a park P range, the reverse R range, the neutral N range, the drive D range, a third speed range, a second speed range, and a low L range.

The torque control regulator valve comprises a hydraulic pressure chamber receiving pressure regulated by the seventh solenoid valve; a first valve spool provided in the hydraulic pressure chamber 195; a second valve spool for selectively cutting off the torque pressure supplied to the control switch valve and the N-D control valve; a first elastic member interposed between the first and second valve spools to elastically support the same; and a second elastic members supporting only the second valve spool and having an elastic force smaller than that of the first elastic member.

The control switch valve comprises a hydraulic pressure chamber receiving hydraulic pressure regulated by the first solenoid valve; and a valve spool selecting lines to which torque pressure from the 1-2 shift valve is supplied.

The 1-2 shift valve comprises first and second ports selectively receiving torque pressure from the control switch valve by the ON/OFF control of the first solenoid valve;

third and fourth ports supplying the received torque pressure from the first and second ports to the 2-3 shift valve; a fifth port receiving drive pressure from the manual valve; a sixth port selectively supplying the torque pressure supplied to the first port and the drive pressure supplied to the fifth port to the second clutch valve; a seventh port connected to the solenoid supply valve to receive solenoid supply pressure; an eighth port receiving solenoid supply pressure by ON/OFF control of the second and fourth solenoid valves; a ninth port receiving solenoid supply pressure by the ON/OFF control of the third solenoid valve; and a valve spool selectively opening and closing the ports by ON/OFF control of the first solenoid valve.

The 2-3 shift valve comprises first and second ports selectively receiving torque pressure from the third and fourth ports of the 1-2 shift valve; a third port receiving torque pressure and drive pressure from the second clutch valve; a fourth port supplying the torque pressure supplied to the first port to the 3-4 shift valve; a fifth ports supplying torque pressure supplied to the second ports to the 3-4 shift valve; a sixth port supplying the torque pressure supplied to the second port and the drive pressure supplied to the third port to the third clutch valve; a seventh port receiving solenoid supply pressure from the solenoid supply valve; an eighth port supplying the solenoid supply pressure supplied to the seventh port to the 3-4 shift valve; a ninth port 339 receiving part of the solenoid supply pressure supplied to the seventh port such that ON/OFF control of the second solenoid valve is received, the ninth port being connected to the eighth port of the 1-2 shift valve; and a valve spool selectively opening and closing the ports according to pressure changes in a hydraulic pressure chamber realized by an increase or decrease in the level of solenoid supply pressure by the ON/OFF control of the second solenoid valve.

The 3-4 shift valve comprises first and second ports selectively receiving torque pressure from the fourth and fifth ports of the 2-3 shift valve; a third port receiving torque pressure and drive pressure from the third clutch valve; a fourth port supplying the torque pressure supplied from the first port and the drive pressure supplied from the third port to the fourth band valve; a fifth port supplying the torque pressure supplied to the second port to the 4-5 shift valve; a sixth port connected to the eighth port of the 2-3 shift valve to supply the solenoid supply pressure from the solenoid supply valve thereto; a seventh port supplying the solenoid supply pressure supplied to the sixth port to the 4-5 shift valve; an eighth port for receiving part of the pressure fed to the sixth port, the eighth port being connected to the ninth port of the 1-2 shift valve; and a valve spool for selectively opening and closing the ports by pressure changes in a hydraulic pressure chamber, the level of pressure therein increasing or decreasing by the ON/OFF control of the third solenoid valve.

The 4-5 shift valve comprises a first port receiving torque pressure from the fifth port of the 3-4 shift valve; a second port receiving torque pressure and drive pressure from the fourth clutch valve; a third port for selectively supplying the torque pressure supplied to the first port and the drive pressure supplied to the second port to the overdrive unit valve; a fourth port connected to the seventh port of the 3-4 shift valve to supply the solenoid supply pressure from the solenoid supply valve thereto; a fifth port connected to the eighth port of the 1-2 shift valve and which receives part of the solenoid supply pressure supplied to the fourth port; and a valve spool for selectively opening and closing the ports by pressure changes in a hydraulic pressure chamber, the level of pressure therein increasing or decreasing by the ON/OFF control of the third solenoid valve.

The second clutch valve comprises a first port for selectively receiving torque pressure and line pressure from the N-D control valve; a second port for supplying the torque pressure and drive pressure supplied to the first port to the first friction element; a third port selectively receiving torque pressure and drive pressure from the 1-2 shift valve; a fourth port for supplying the torque pressure and drive pressure supplied to the third port to the fourth friction element and the 2-3 shift valve; and a valve spool for selectively opening and closing the ports by the torque pressure and drive pressure and which is elastically supported by an elastic member.

The third clutch valve comprises a first port for receiving drive pressure from the manual valve; a second port for supplying the drive pressure supplied to the first port to the sixth friction element; a third port for selectively receiving torque pressure and drive pressure supplied to the 2-3 shift valve; a fourth port which supplies the torque pressure and the drive pressure supplied to the third port to the 3-4 shift valve; and a valve spool selectively opening and closing the ports by the torque pressure and drive pressure supplied to the third port and which is elastically supported by an elastic member.

The fourth band valve comprises a first port receiving drive pressure from the manual valve; a second port for supplying the drive pressure received by the first port to the eighth friction element; a third port for selectively receiving torque pressure and drive pressure from the 3-4 shift valve; a fourth port for supplying the torque pressure and the drive pressure supplied to the third port to the 4-5 shift valve; and a valve spool for selectively opening and closing the ports by the torque pressure and drive pressure and which is elastically supported by an elastic member.

The overdrive unit valve comprises a first port for receiving line pressure from the pressure regulator valve; a second port for supplying the line pressure received by the first port to the second friction element; a third port for selectively receiving torque pressure and drive pressure supplied to the 4-5 shift valve; a fourth port for supplying the torque pressure and drive pressure supplied to the third port to the seventh friction element; and a valve spool for selectively opening and closing the ports by the torque pressure and drive pressure supplied to the third port and which receives elastic force from an elastic member.

The N-D control valve comprises a first port receiving line pressure from the pressure regulator valve; a second port receiving torque pressure from the torque control regulator valve; a third port for receiving drive pressure from the manual valve; a fourth port for selectively supplying the line pressure and torque pressure supplied to the first and second ports to the second clutch valve; a fifth port for supplying the torque pressure received by the second port to the third friction element; a sixth port for supplying the drive pressure supplied to the third port to the third friction element; and a valve spool for opening and closing the ports by the torque pressure supplied to the sixth port through the second and fifth ports, the valve spool being elastically supported by an elastic member.

The manual valve allows shifting into the neutral N, drive D, third speed, second speed, and low L ranges.

The first and second friction elements directly receive line pressure from the pressure regulator valve in the neutral N range.

In a first speed of the drive D range, the second friction element is maintained operating as in the neutral N range, the third friction element is operated, and the first friction element is disengaged, the first friction element being first operated by torque pressure, when the third friction element is operated by drive pressure from torque pressure during shifting into the first speed of the drive D range from the neutral N range, then disengaged when shifting into the first speed is completed.

The third friction element controls the seventh solenoid valve to OFF to allow control by drive pressure from torque pressure by the N-D control valve.

In a second speed of the drive D range, the fourth friction element is operated with the friction elements operated in the first speed of the drive D range, and the third and fourth solenoid valves, controlling the 1-2 shift valve, are OFF controlled, and the first solenoid valve, controlling the control switch valve, is ON controlled such that the fourth friction element is operated first by torque pressure then by drive pressure.

In a third speed of the drive D range, the fifth friction element is operated with the friction elements operating in the second speed of the drive D range, and the second solenoid valve, controlling the 2-3 shift valve, is OFF controlled, and the first solenoid valve, operating the control switch valve, is OFF controlled such that the fifth friction element is first operated by torque pressure then drive pressure.

In a fourth speed of the drive D range, the sixth friction element is operated with the friction elements operating in the third speed of the drive D range, and the third solenoid valve, controlling the 3-4 shift valve, is controlled to ON, and the first solenoid valve, controlling the control switch valve, is controlled to ON such that the sixth friction element is first operated by torque pressure then drive pressure.

In a fifth speed of the drive D range, the third, fourth, fifth, and sixth friction elements, operating in the fourth speed, are maintained operating, the second friction element is disengaged, and the seventh friction element is operated, the seventh friction element being first operated by torque pressure then by drive pressure by the ON control of the fourth solenoid valve, controlling the 4-5 shift valve, and the OFF control of the first solenoid valve, controlling the control switch valve.

In the low L range, the second friction is operated by line pressure supplied from the pressure regulator valve, the sixth and eighth friction elements are operated by drive pressure supplied from the manual valve, and the third friction element is operated by torque pressure supplied to the N-D control valve through the torque control regulator valve by the OFF control of the seventh solenoid valve, after which the first friction element is operated by torque pressure.

When shifting from the fourth speed of the drive D range to the low L range, the second and third friction elements are maintained in operating states, the second and fourth solenoid valves are OFF controlled to disengage the fourth and fifth friction elements, the sixth friction element is operated by the release of drive pressure supplied through the fourth band valve and the drive pressure supplied from the manual valve, the eighth friction element is operated by drive pressure supplied from the manual valve, and the seventh solenoid valve is OFF controlled to allow the first friction element to be operated by torque pressure supplied through the N-D control valve.

When shifting from the third speed of the drive D range to the low L range, the second and third friction elements are maintained operating; the second, third, and fourth solenoid valves are OFF controlled to disengage the fourth and fifth friction elements; the sixth and eighth friction elements are operated by drive pressure directly received from the manual valve; and to operate the first friction element, the seventh solenoid valve is OFF controlled by torque pressure supplied through the N-D control valve.

When shifting from the second speed of the drive D range to the low L range, the second and third friction elements are maintained in operating states, the third and fourth solenoid valves are OFF controlled to disengage the fourth friction element, the sixth and eighth friction elements directly receive drive pressure from the manual valve to be operated, and the seventh solenoid valve is OFF controlled by torque pressure supplied from the N-D control valve to operate the first friction element.

When shifting into a first speed of a third range, each solenoid valve is controlled as in the first speed of the drive D range, and the eighth friction element is operated by drive pressure supplied from the manual valve via the fourth band valve.

When shifting to a second speed of the third range, each solenoid valve is controlled as in the second speed of the drive D range, and the eighth friction element is operated by drive pressure supplied from the manual valve via the fourth band valve.

When shifting to a third speed of the third range, each solenoid valve is controlled as in the third speed of the drive D range, and the eighth friction element is operated by drive pressure supplied from the manual valve via the fourth band valve.

When shifting from the first speed of the third range to the low L range, shift control is identical to that when shifting from the first speed of the drive D range to the low L range except the eighth friction element is operated by drive pressure supplied from the manual valve.

When shifting from the second speed of the third range to the low L range, shift control is identical to that when shifting from the second speed of the drive D range to the low L range except the eighth friction element is operated by drive pressure supplied from the manual valve.

When shifting from the third speed of the third range to the low L range, shift control is identical to that when shifting from the third speed of the drive D range to the low L range except the eighth friction element is operated by drive pressure supplied from the manual valve.

When shifting into a first speed of a second range, each solenoid valve is controlled as in the first speed of the drive D range, the fifth friction element is operated by drive pressure supplied from the manual valve through the third clutch valve, and the eighth friction is operated by drive pressure supplied through the fourth band valve.

When shifting into a second speed of the second range, each solenoid valve is controlled as in the second speed of the drive D range, the fifth friction element is operated by drive pressure supplied from the manual valve through the third clutch valve, and the eighth friction is operated by drive pressure supplied through the fourth band valve.

When shifting from the first speed of the second range to the low L range, shift control is identical to that when shifting from the first speed of the drive D range to the low L range except for the operating of the sixth and eighth friction elements by the drive pressure supplied from the manual valve.

When shifting from the second speed of the second range to the low L range, shift control is identical to that when shifting from the second speed of the drive D range to the low L range except for the operating of the sixth and eighth friction elements by the drive pressure supplied from the manual valve.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
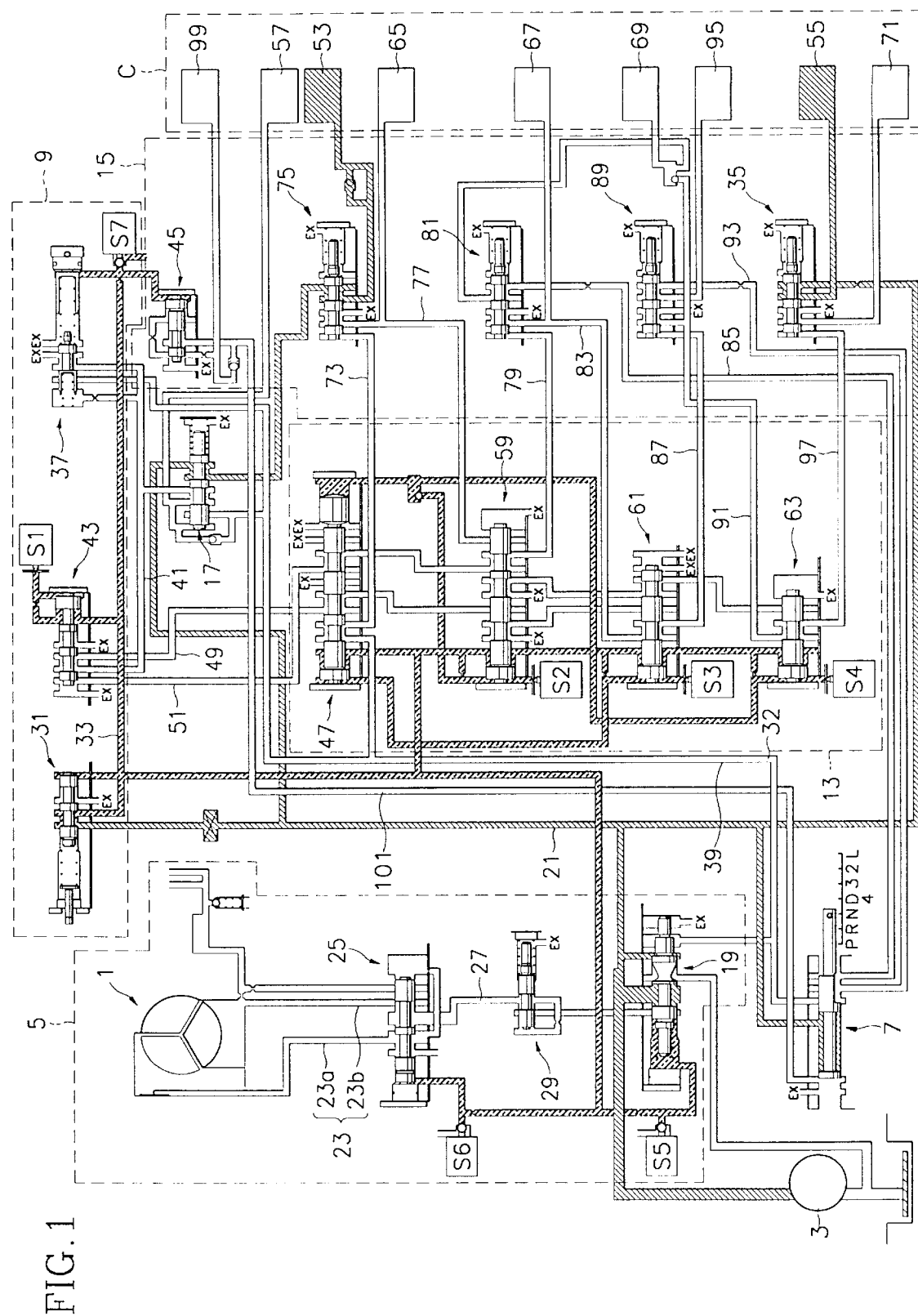
FIG. 1 is a hydraulic circuit diagram of a hydraulic control system in a neutral N range according to a preferred embodiment of the present invention.

Preferred embodiments of the present invention will now be described in detail with reference to the accompanying drawings.

Certain terminology will be used in the following description for convenience and reference only and will not be limiting. The words "right" and "left" will designate directions in the drawings to which reference is made.

Referring to FIG. 1, there is shown a hydraulic circuit diagram of a hydraulic control system in a neutral N range according to a preferred embodiment of the present invention.

As shown in the drawing, the hydraulic control system includes a torque converter 1 mounted between a crankshaft of an engine and a transmission and which converts engine power to torque, an oil pump 3 including a drive gear mounted to a pump drive hub of the torque converter 1 and rotating together with the same and a driven gear meshed and rotating with the drive gear, and a converter clutch control portion 5 which varies hydraulic pressure generated by the oil pump 3 to engage and disengage a converter clutch mounted to the torque converter 1.

The hydraulic control system also includes a torque pressure converting portion 9 which reduces line pressure supplied from the oil pump 3 to convert the same to solenoid supply pressure used as control pressure by first-seventh solenoid valves S1–S7, and which reduces drive pressure supplied from a manual valve 7 to convert the same to torque pressure. Further included are first and second control portions 13 and 15 which selectively receive the torque pressure, drive pressure, and line pressure from the torque pressure converting portion 9 to control friction elements 11 of each shift range.

A N-D control valve 17 is provided in the hydraulic control system which controls one friction element using line pressure in a neutral N range, and controls other friction elements first using torque pressure then using drive pressure in a drive D range.

A pressure regulator valve 19 is connected to a pressure line 21 such that line pressure supplied from the oil pump 3 can be varied when changing to the drive D range and a reverse R range from the neutral N range. A valve spool of the pressure regulator valve 19 is moved by the fifth solenoid valve S5, controlled by a transmission control unit (TCU), to regulate the line pressure supplied to the pressure line 21. The pressure regulator valve 19 is also connected to a line 23, for controlling the converter clutch of the torque converter 1, via a converter clutch regulator valve 25.

A converter feed valve 29 is mounted on a line 27 connecting the converter clutch regulator valve 25 and the pressure regulator valve 19. The converter feed valve 29 controls the supply of hydraulic pressure to the clutch regulator valve 25. The converter clutch regulator valve 25, receiving hydraulic pressure via the converter feed valve 29, connects either line 23a or 23b to the line 27 by a hydraulic pressure exhaust process accomplished through the operation of the sixth solenoid valve S6 controlled by the TCU. As a result, the converter clutch is able to be engaged and disengaged.

Further, the pressure line 21 is connected to a solenoid supply pressure line 33 via a solenoid supply valve 31 of the torque pressure converting portion 9. The solenoid supply valve 31 is formed such that line pressure received is reduced to be changed to supply pressure for supply to the first-seventh solenoid valves S1–S7.

The pressure line 21 is branched off to enable the supply of hydraulic pressure from the oil pump 3 to the manual valve 7, and for connection to an overdrive unit valve 35 of the second control portion 15 and the N-D control valve 17. The latter connection serves to allow two friction elements 11 to be operated in the neutral N range.

The solenoid supply pressure supplied to the solenoid supply pressure line 33 is supplied to the seventh solenoid valve S7, operated by the TCU, the seventh solenoid valve S7 being mounted enabling control of a torque control regulator valve 37. The torque control regulator valve 37 is connected to the manual valve 7 through a drive pressure line 39 to receive drive pressure. The torque control regulator valve 37 reduces this drive pressure to torque pressure for supplying the same to a control switch valve 43 and the N-D control valve 17.

The seventh solenoid valve S7, controlling the solenoid supply pressure supplied to the solenoid supply pressure line 33, is mounted such that it is able to control the torque control regulator valve 37, and, at the same time, extend the solenoid supply pressure line 33 to allow for control of a reverse clutch inhibitor valve 45.

The reverse clutch inhibitor valve 45 is a safety device which prevents the vehicle from reversing when a driver inadvertently selects the reverse R range while driving in one of the forward ranges. This operation by the reverse clutch inhibitor valve 45 is accomplished by the seventh solenoid valve S7 exhausting hydraulic pressure.

The control switch valve 43, receiving torque pressure from the torque control regulator valve 37, is connected to lines 49 and 51 to selectively supply torque pressure to a 1-2 shift valve 47 of the first control portion 13 according to the operation of the first solenoid valve S1, the first solenoid valve S1 being controlled by the TCU and which controls the solenoid supply pressure supplied to the solenoid supply pressure line 33.

The pressure line 21 is connected to the N-D control valve 17 and an overdrive unit valve 35 such that first and second friction elements 53 and 55 are operated in the neutral N range.

The manual valve 7 has parking P, reverse R, neutral N, D, 3, 2, and L range modes. In D, 3, 2, and L ranges, the manual valve 7 receives line pressure from the pressure line 21 and supplies drive pressure to the drive pressure line 39.

The drive pressure line 39 supplies drive pressure to the torque control regulator valve 37, the N-D control valve 17, and the 1-2 shift valve 47. The drive pressure supplied to the torque control regulator valve 37 is converted to torque pressure by the control operation of the seventh solenoid valve S7 and supplied to the control switch valve 43 and the N-D control valve 17.

The N-D control valve 17 supplies line pressure supplied to the line 21 to the first friction element 53 in the neutral N range, supplies drive pressure to the first friction element 53 in drive D, 3, 2, and L ranges, and after supplying torque pressure to a third friction element 57 supplies drive pressure to the same. The first friction element 53 is OFF operated after shifting to a first speed of the drive D range is completed.

The 1-2 shift valve 47 selectively receives torque pressure from the lines 49 and 51 and supplies this torque pressure to 2-3, 3-4, and 4-5 shift valves 59, 61, and 63; receives solenoid supply pressure from the solenoid supply line 21 and supplies this pressure to the second, third, and fourth solenoid valves S2, S3, and S4, which control the 2-3, 3-4, and 4-5 shift valves 59, 61, and 63; and receives drive pressure from the drive pressure line 39 and supplies this pressure to the fourth, fifth, sixth, and seventh friction elements 65, 67, 69, and 71.

The solenoid supply pressure line 33 supplying solenoid supply pressure to the 1-2 shift valve 47 is connected enabling supply of hydraulic pressure to the 2-3 shift valve 59, the 2-3 shift valve 59 is connected enabling supply of hydraulic pressure to the 1-2 shift valve 47 and the 3-4 shift valve 61, the 3-4 shift valve 61 is connected enabling supply of hydraulic pressure to the 1-2 shift valve 47 and the 4-5 shift valve 63, and the 4-5 shift valve 63 is connected enabling supply of hydraulic pressure to the 1-2 shift valve 47.

The 1-2 shift valve 47 is connected to a second clutch valve 75, which supplies hydraulic pressure to the fourth friction element 65, via a line 73, and the second clutch valve 75 is connected to the 2-3 shift valve 59 via a line 77.

The 2-3 shift valve 59 is connected to a third clutch valve 81, which supplies hydraulic pressure to the fifth friction element 67, via a line 79, and the third clutch valve 81 is connected to the 3-4 shift valve 81 to supply hydraulic pressure to the same via a line 83. Also, the third clutch valve 81 directly receives drive pressure from the manual valve 7 via a line 85 when 2 and L ranges are selected such that the sixth friction element 69 is operated.

The 3-4 shift valve 61 is connected to a fourth band valve 89, which supplies hydraulic pressure to the sixth friction element 69, via a line 87, the fourth band valve 89 being connected to the 4-5 shift valve 63 to supply hydraulic pressure to the same via a line 91. Also, the fourth band valve 89 directly receives drive pressure from the manual valve 7 via a line 93 when 3 range is selected such that an eighth friction element 95 can be operated.

The 4-5 shift valve 63 is connected to the overdrive unit valve 35, which supplies hydraulic pressure to the seventh friction element 71, via a line 97. The overdrive unit valve 35 directly supplies line pressure to the second friction element 55 via the pressure line 21, the second friction element 55 operating in all shift ranges except for the drive fifth speed range.

Also, the friction elements 11 include a ninth friction element 99, the ninth friction element 99 being a reverse friction element operating only when the reverse R range has been selected. To enable reception of reverse pressure, the ninth friction element 99 is connected to the reverse clutch inhibitor valve 45 which, in turn, is connected to the manual valve 7 via a reverse pressure line 101.

Figure 2:
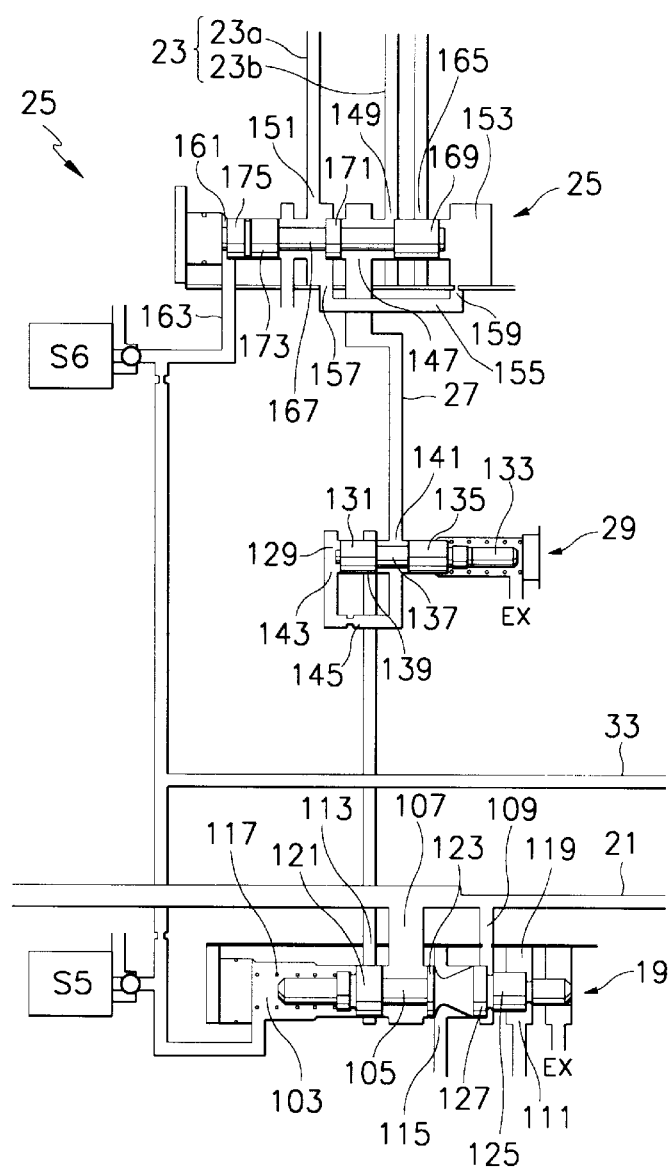
FIG. 2 is a schematic diagram of a converter clutch control portion used to explain a hydraulic control system for automatic transmissions according to a preferred embodiment of the present invention.

Referring now to FIG. 2, shown is a schematic diagram of the converter clutch control portion 5 in the hydraulic control system for automatic transmissions according to a preferred embodiment of the present invention.

As shown in the drawing, the pressure regulator valve 19 of the converter clutch control portion 5 includes a hydraulic pressure chamber 103 connected to the solenoid supply pressure line 33 and a valve spool 105 which controls the flow of hydraulic pressure in the pressure regulator valve 19 according to the operation of the fifth solenoid valve S5.

Formed on the pressure regulator valve 19 are first and second ports 107 and 109 connected to the pressure line 21, a third port 111 connected to the drive pressure line 39, a fourth port 113 connected to the converter feed valve 29, and a fifth port 115 which returns oil to an oil pan to reduce line pressure when it increases to an excessive level.

The valve spool 105 is biased in a rightward direction by an elastic member 117 provided in the hydraulic pressure chamber 103 to which hydraulic pressure is applied or released according to an ON/OFF operation of the fifth solenoid valve S5. Also, another hydraulic pressure chamber 119 is provided in the pressure regulator valve 19. Hydraulic pressure flowed into this hydraulic pressure chamber 119 gives resistance to the hydraulic pressure in the above hydraulic pressure chamber 103. The hydraulic pressure chamber 119 is connected to the third port 111 to receive drive pressure such that the valve spool 105 is moved by the control of the fifth solenoid valve S5 to ON/OFF states.

Namely, if the fifth solenoid valve S5 is controlled to OFF and the hydraulic pressure level in the hydraulic pressure chamber 103 rises, force from the hydraulic pressure and the biasing force of the elastic member 117 combine such that the combined force becomes larger than that existing from the hydraulic pressure in the hydraulic pressure chamber 119. As a result, the valve spool 105 moves to the right. However, if the fifth solenoid valve S5 is controlled to an ON state such that the pressure in the hydraulic pressure chamber 103 is reduced, the hydraulic pressure in the other hydraulic pressure chamber 119 overcomes the force of the elastic member 117 to move the valve spool 105 to the left.

The movement of the valve spool 105 as in the above selectively opens and closes the first, second, third, fourth, and fifth ports 107, 109, 111, 113, and 115 to receive or stop the supply of hydraulic pressure.

The supply or blocking of hydraulic pressure is realized through lands formed on the valve spool 105. There are provided a first land 121 for opening/closing the fourth port 113, a second land 123 for opening/closing the fifth port 115, and a third land 125 having a surface on which the pressure of the hydraulic pressure chamber 119 acts. A fourth land 127 is formed between the second land 123 and the third land 125, the fourth land 127 having a slanted surface such that, when line pressure supplied to the first port 107 increases, hydraulic pressure is not exhausted through the fifth port 115 too quickly.

The converter feed valve 29, receiving hydraulic pressure from the fourth port 113 of the pressure regulator valve 19, includes a valve spool 137 provided with a first land 131 having a surface on which hydraulic pressure in a hydraulic pressure chamber 129 acts, and a second land 135 receiving biasing force from an elastic member 133 in a direction opposite that given by the hydraulic pressure chamber 129.

The above first land 131 is formed such that the first port 139, communicating with the fourth port 113 of the pressure regulator valve 19, is opened and closed to selectively supply hydraulic pressure to the second port 141. This operation is realized through the selective supply of hydraulic pressure to the hydraulic pressure chamber 129 through a bypass line 145 connecting the second port 141 to the third port 143. That is, in a state where a level of hydraulic pressure is reduced in the hydraulic pressure chamber 129, the valve spool 137 moves to the left by the force applied by the elastic member 133 such that the first and second ports 139 and 141 are in communication. Also, when the hydraulic pressure in the hydraulic pressure chamber 129 rises to a level overcoming the force of the elastic member 133, the valve spool 137 moves to the right such that communication between the first and second ports 139 and 141 and flow of hydraulic pressure through the bypass line 145 are discontinued.

The converter clutch regulator valve 25, connected to the second port 141 of the converter feed valve 29 through the line 27, includes a first port 147 connected to the line 27, second and third ports 149 and 151 connected to the lines 23a and 23b supplying and exhausting hydraulic pressure to and from the converter clutch, fourth and fifth ports 157 and 159 connected through a bypass line 155 to supply hydraulic pressure flowing into the first port 147 to a hydraulic pressure chamber 153, a sixth port 163 through which solenoid supply pressure, supplied through the solenoid supply pressure line 33, is supplied to another hydraulic pressure chamber 161, and a seventh port 165 for supplying hydraulic pressure to a cooler and, at the same time, supplying hydraulic pressure to an axle supply portion and a powertrain, where friction elements of shift ranges are located.

The above ports are opened and closed by a valve spool 167 mounted in the converter clutch regulator valve 25. The valve spool 167 includes a first land 169 having a surface on which hydraulic pressure in a hydraulic pressure chamber 153 acts, second and third lands 171 and 173 having surfaces on which hydraulic pressure supplied to the first port 147 acts, and a fourth land 175 having a surface on which hydraulic pressure in another hydraulic pressure chamber 161 acts.

The pressure in the hydraulic pressure chamber 161 is supplied or released by control of the sixth solenoid valve S6 to ON/OFF states. The valve spool 167 of the converter clutch regulator valve 25 is moved to the right and left through this supply and release of hydraulic pressure to and from the hydraulic pressure chamber 161.

Figure 3:
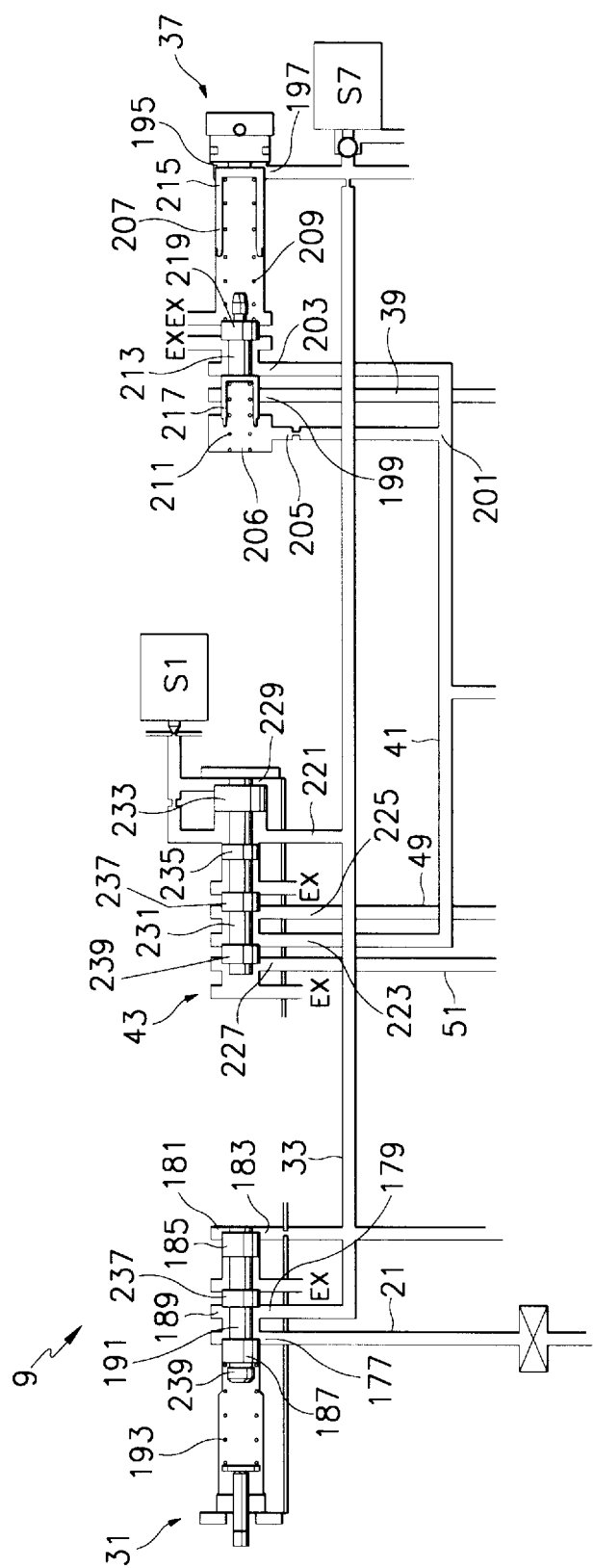
FIG. 3 is a schematic diagram of a torque pressure converting portion used to explain a hydraulic control system for automatic transmissions according to a preferred embodiment of the present invention.

Referring now to FIG. 3, there is shown a schematic diagram of the torque pressure converting portion 9 of the hydraulic control system for automatic transmissions according to a preferred embodiment of the present invention.

As shown in the drawing, the solenoid supply valve 31 includes a first port 177 connected to the pressure line 21 to receive line pressure from the pressure regulator valve 19, a second port 179 connected to the solenoid supply pressure line 33 to be selectively communicated with the first port 177, and a third port 183 connected to the solenoid supply pressure line 33 to receive hydraulic pressure from the second port 179 for supply to a hydraulic pressure chamber 181.

Also, the solenoid supply valve 31 includes a valve spool 191 and an elastic member 193 elastically supporting the valve spool 191 and providing biasing force against the hydraulic pressure operating in the hydraulic pressure chamber 181. The valve spool 191 includes a first land 185 having a surface on which hydraulic pressure supplied to the hydraulic pressure chamber 181 acts, and second and third lands 187 and 189 for opening and closing the first and second ports 177 and 179.

The torque control regulator valve 37, converting the drive pressure supplied to the drive pressure line 39 to torque pressure by duty control of the seventh solenoid valve S7 connected through the solenoid supply valve 31 and the solenoid supply pressure line 33, includes a first port 197 connecting the solenoid supply pressure line 33 to a hydraulic pressure chamber 195, a second port 199 connected to the drive pressure line 39 to receive drive pressure, and third and fourth ports 203 and 205 connected to a torque pressure line 201 to allow supply of hydraulic pressure to the N-D control valve 17 and the control switch valve 43. The fourth port 205 is connected to another hydraulic pressure chamber 206 formed in the torque control regulator valve 37.

A first valve spool 207, moved to left and rightward directions by duty control of the seventh solenoid valve S7, is provided in the hydraulic pressure chamber 195 of the torque control regulator valve 37, the first valve spool 207 opening and closing the first port 197. A first elastic member 209 is interposed in the torque control regulator valve 37 on a side where the first valve spool 207 is provided. Also, a second valve spool 213 is provided in the torque control regulator valve 37 such that the second valve spool 213 receives biasing force from a second elastic member 211 in a direction opposite that exerted by the first elastic member 209.

The first valve spool 207 is realized through a cup-shaped plug 215, while the second valve spool 213 is realized through a cup-shaped plug 217 and a land 219. The plugs 215 and 217 of the first and second valve spools 207 and 213 are elastically supported by the first and second elastic members 209 and 211, respectively.

In the above, as one side of the first elastic member 209 elastically supports the plug 215 of the first valve spool 207 and the other side elastically supports the land 219 of the second valve spool 213, if hydraulic pressure in the hydraulic pressure chamber 195 acts on the plug 215, the first elastic member 209 contracts to exert biasing force on the second valve spool 213. Namely, when the first elastic member 209 contracts through this operation, elastic force of the first elastic member 209 becomes greater than that exerted by the second elastic member 211 such that the second valve spool 213 is moved to the left.

The control switch valve 43, connected to the torque control regulator valve 37 via the torque pressure line 41 to receive torque pressure, is controlled by the first solenoid valve S1 and includes a first port 221 connected to the solenoid supply pressure line 33, a second port 223 connected to the torque pressure line 41, and third and fourth ports 225 and 227 connected to the 1-2 shift valve 47 via the lines 49 and 51.

The first port 221 is connected to a hydraulic pressure chamber 229 to which hydraulic pressure is supplied or cut off by the ON/OFF operation of the first solenoid valve S1.

Movement of a valve spool 231 by hydraulic pressure in the hydraulic pressure chamber 229 opens and closes the ports of the control switch valve 43. The valve spool 231 includes a first land 233 having a surface on which hydraulic pressure in the hydraulic pressure chamber 229 acts, a second land 235 guiding the hydraulic pressure supplied to the first port 221 to the hydraulic pressure chamber 229, third and fourth lands 237 and 239 which selectively communicate the second port 223 to the third and fourth ports 225 and 227.

Figure 4:
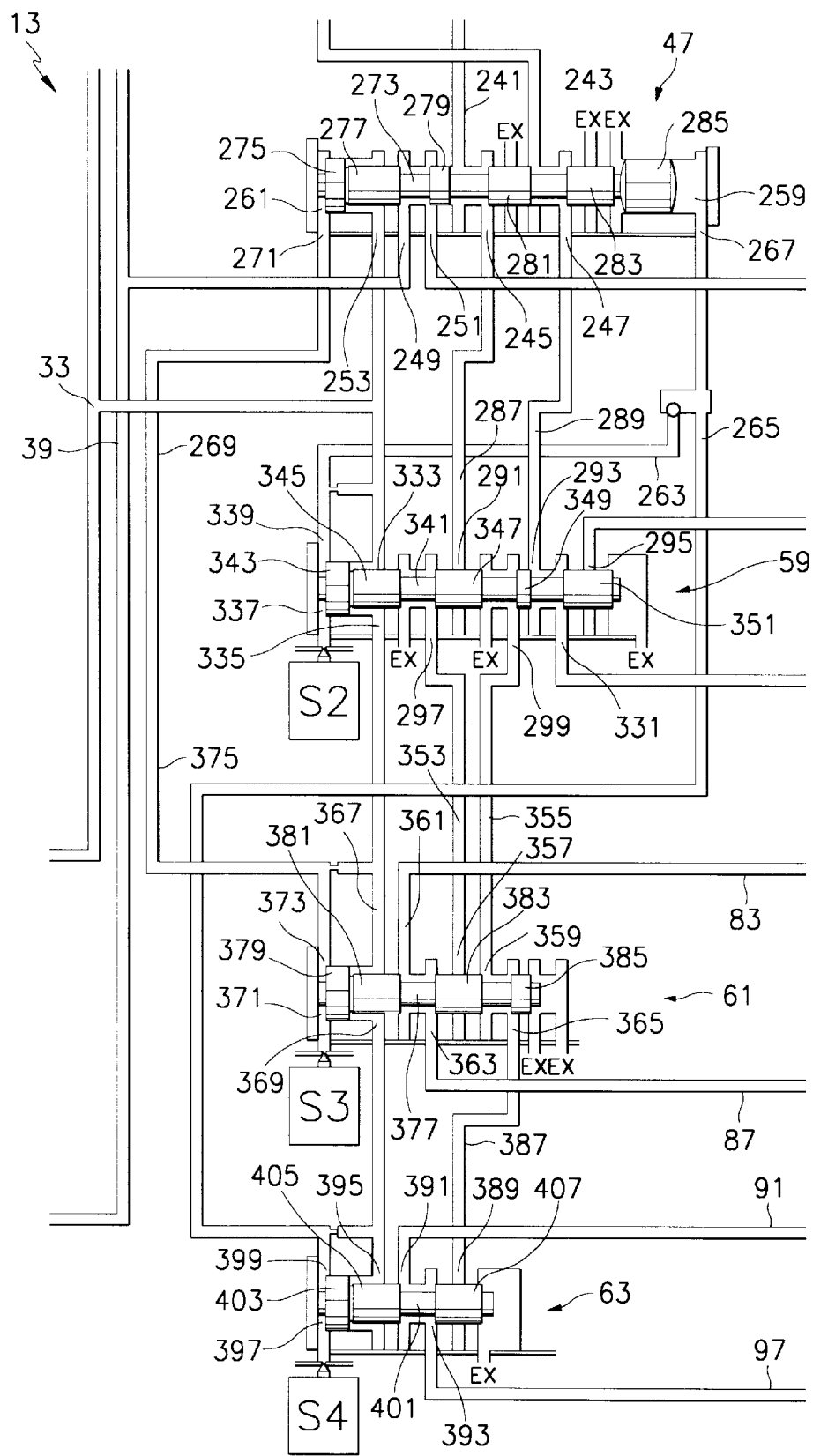
FIG. 4 is a schematic diagram of a shift first control portion used to explain a hydraulic control system for automatic transmissions according to a preferred embodiment of the present invention.

Referring to FIG. 4, shown is a schematic diagram of the first control portion 13 of the hydraulic control system for automatic transmissions according to a preferred embodiment of the present invention.

As shown in the drawing, the 1-2 shift valve 47, including first and second ports 241 and 243 connected to the lines 49 and 51 to receive torque pressure from the control switch valve 43, also includes third and fourth ports 245 and 247 supplying the received torque pressure to the 2-3 shift valve 59, a fifth port 249 connected to the drive pressure line 39 to receive drive pressure, a sixth port 251 connected to the second clutch valve 75 via the line 73 such that the received drive pressure is supplied to the fourth friction element 65 and the 2-3 shift valve 59, and a seventh port 253 connected to the solenoid supply pressure line 33 to receive solenoid supply pressure.

Also, the 1-2 shift valve 47 includes hydraulic pressure chambers 259 and 261 provided on opposite sides of thereof. An eighth port 267, connected to lines 263 and 265, is formed on the right side of the 1-2 shift valve 47 such that hydraulic pressure, generated by control of the second and fourth solenoid valves S2 and S4, can operate in the hydraulic pressure chamber 259. There is further provided a ninth port 271 on the left side of the 1-2 shift valve 47, the ninth port 271 being connected to a line 269 to allow hydraulic pressure generated by control of the third solenoid valve S3 to operate in the hydraulic pressure chamber 261.

Accordingly, a valve spool 273 moves within the 1-2 shift valve 47 according to a difference in hydraulic pressure levels provided in the hydraulic pressure chambers 259 and 261. This movement of the valve spool 273 opens and closes the above ports.

The valve spool 273 includes a first land 275 having a reaction area on which hydraulic pressure inside the hydraulic pressure chamber 261 and hydraulic pressure supplied from the seventh port 253 act, a second land 277 for blocking the interconnection between the fifth and sixth ports 249 and 251, a third land 279 selectively interconnecting the first port 241 to the third and sixth ports 245 and 251, fourth and fifth lands 281 and 283 for blocking the interconnection between the second port 243 and the fourth port 247, and a sixth land 285 having a reaction area on which pressure in the hydraulic pressure chamber 259 acts.

The above first and sixth lands 275 and 285 have larger reaction areas than the other lands. The hydraulic pressure inside the hydraulic pressure chambers 261 and 259 acts on the first and sixth lands 275 and 285, respectively, to move the valve spool 273 in the 1-2 shift valve 47 in a longitudinal direction therein. The pressure level inside the hydraulic pressure chamber 259 increases/decreases by the ON/OFF operation of the second and fourth solenoid valves S2 and S4, and the pressure level inside the hydraulic pressure chamber 261 increases/decreases by the ON/OFF operation of the third solenoid valve S3.

The 2-3 shift valve of the first control portion 13 includes first and second ports 291 and 293 connected to the third and fourth ports 245 and 247 of the 1-2 shift valve 47 via lines 287 and 289, respectively. The 2-3 shift valve also includes a third port 295 connected to the line 77 to receive torque pressure and drive pressure from the second control valve 75, fourth and fifth ports 297 and 299 for supplying torque pressure supplied to the first and second ports 291 and 293 to the 3-4 shift valve 61, and a sixth port 331 connected to the line 79 such that torque pressure supplied to the second port 293 or drive pressure supplied to the third port 295 can be selectively supplied to the fifth friction element 67 and the third clutch valve 81 which supplies hydraulic pressure to the 3-4 shift valve 61.

The 2-3 shift valve 59 also includes a seventh port 333 receiving hydraulic pressure from the solenoid supply pressure line 33, an eighth port 335 supplying the solenoid supply pressure supplied to the seventh port 33 to the 3-4 shift valve 61, and a ninth port 339 which operates part of the pressure supplied to the seventh port 333 in a hydraulic pressure chamber 337.

The ninth port 339 is connected the hydraulic pressure chamber 259 of the 1-2 shift valve 47 via the line 263 such that the pressure level in the hydraulic pressure chamber 337 is raised and lowered by the ON/OFF operation of the second solenoid valve S2. Accordingly, the valve spool 341 is moved inside the 2-3 shift valve 59, along a longitudinal direction of the same.

The valve spool 341 of the 2-3 shift valve 59 includes a first land 343 having a reaction area on which the pressure inside the hydraulic pressure chamber 337 and the pressure supplied to the seventh and ninth ports 333 and 339 act, second and third lands 345 and 347 which block the connection between the first and fourth ports 291 and 297, a fourth land 349 for selectively interconnecting the second port 293 to the fifth and sixth ports 299 and 331, and a fifth land 351 for closing the connection between the third port 295 and the sixth port 331.

For the reception of torque pressure, the 3-4 shift valve 61 includes first and second ports 357 and 359 connected to the fourth and fifth ports 297 and 299 of the 2-3 shift valve 59 via lines 353 and 355, respectively. The 3-4 shift valve 61 also includes a third port 361 connected to the line 83 to receive torque pressure and drive pressure from the third control valve 81, a fourth port 363 connected to the line 87 to selectively supply torque pressure supplied to the first port 357 or drive pressure supplied to the third port 361 to a fourth band valve 89 such that the pressure can be supplied to the sixth friction element and the 4-5 shift valve 63, and a fifth port 365 for supplying torque pressure supplied to the second port 359 to the 4-5 shift valve 63.

The 3-4 shift valve 61 further includes a sixth port 367 for receiving supply pressure from the eighth port 335 of the 2-3 shift valve 59, a seventh port 369 which supplies solenoid supply pressure from the sixth port 367 to the 4-5 shift valve 63, and an eighth port 373 for supplying part of the pressure fed to the sixth port 367 to operate in a hydraulic pressure chamber 371.

The eighth port 373 is connected to the hydraulic pressure chamber 261 of the 1-2 shift valve 47 via a line 375 and raises/lowers the level of pressure in the hydraulic pressure chamber 261 by the ON/OFF operation of the third solenoid valve S3. Accordingly, the valve spool 377 moves in the 3-4 shift valve 61, along a longitudinal direction therein.

The valve spool 377 of the 3-4 shift valve includes a first land 379 having a reaction area on which hydraulic pressure in the hydraulic pressure chamber 371 and hydraulic pressure supplied to the sixth and eighth ports 367 and 373 act, second and third lands 381 and 383 which block the interconnection between the third and fourth ports 361 and 363, and a fourth land 385 for selectively communicating the second port 359 with the fifth port 365.

The 4-5 shift valve 63 includes a first port 389 connected to the fifth port 365 of the 3-4 shift valve 61 via a line 387 to receive torque pressure, a second port 391 connected to the line 91 to receive torque and drive pressure from the fourth band valve 89, and a third port 393 connected to the line 97 to selectively supply the torque pressure supplied to the first port 389 or the drive pressure supplied to the second port 391 to the overdrive unit valve 35 supplying the pressure to the seventh friction element 71.

The 4-5 shift valve 63 further includes a fourth port 395 for receiving solenoid supply pressure from the seventh port 369 of the 3-4 shift valve 61, and a fifth port 399 for providing part of the hydraulic pressure received by the fourth port 395 to a hydraulic pressure chamber 397.

The fifth port 399 is connected to the hydraulic pressure chamber 259 of the 1-2 shift valve 47 via the line 265, and raises and lowers the pressure level in the hydraulic pressure chamber 397 by the ON/OFF operation of the fourth solenoid valve S4. Accordingly, a valve spool 401 is moved longitudinally along the inside of the 4-5 shift valve 63.

The valve spool 401 of the 4-5 shift valve 63 includes a first land 403 having a reaction area on which hydraulic pressure inside the hydraulic pressure chamber 397 and hydraulic pressure supplied to the fourth and fifth ports 395 and 399 act, and second and third lands 405 and 407 selectively interconnecting the first and second ports 389 and 391 to the third port 393.

Figure 5:
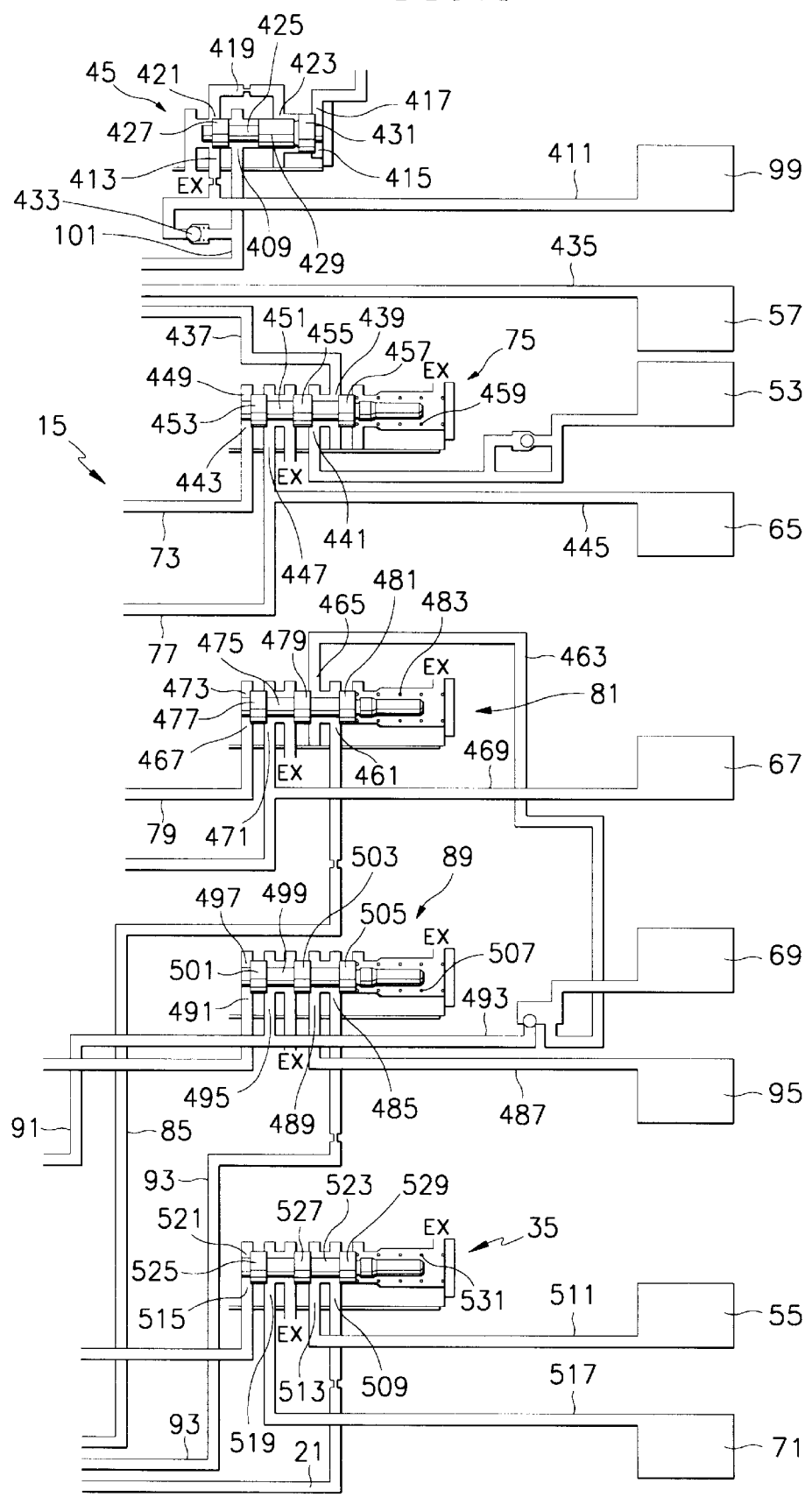
FIG. 5 is a schematic diagram of a shift second control portion used to explain a hydraulic control system for automatic transmissions according to a preferred embodiment of the present invention.

Referring now to FIG. 5, there is shown a schematic diagram of the second control portion 15 of the hydraulic control system for automatic transmissions according to a preferred embodiment of the present invention. As shown in the drawing, the reverse clutch inhibitor valve 45 includes a first port 409 receiving hydraulic pressure from the manual valve 7 via the reverse pressure line 101, a second port 413 connected to a line 411 to supply pressure to the ninth friction element 99, a third port 417 supplying solenoid supply pressure to a hydraulic pressure chamber 415 according to duty control of the seventh solenoid valve S7, and fourth and fifth ports 421 and 423 connected to a bypass line 419.

A valve spool 425, opening and closing the above ports according to hydraulic pressure operating in the hydraulic pressure chamber 415 includes first and second lands 427 and 429 for adjusting and supplying reverse pressure from the first port 409 to the second port 413, and a third land 431 having a reaction area on which the hydraulic pressure in the hydraulic pressure chamber 415 acts.

To allow operation in the drive D, third speed, second speed, and low L ranges, the third friction element 57 is connected to the N-D control valve 17 via a line 435.

The second clutch valve 75, having a first port 439 connected to the N-D control valve 17 via a line 437 to receive torque pressure or line pressure, also includes a second port 441 for supplying the torque pressure or line pressure received by the first port 439 to the third friction element 53, a third port 443 connected to the sixth port 251 of the 1-2 shift valve 47 via the line 73, and a fourth port 447 connected to the fourth friction element 64 via a line 445 and to the 2-3 shift valve 59 via the line 77.

The above ports are open and closed by a valve spool 451 moving inside the second clutch valve 75 along a longitudinal direction therein by hydraulic pressure operating in a hydraulic pressure chamber 449. The valve spool 451 includes a first land 453 which directly receives hydraulic pressure from the hydraulic pressure chamber 449 and interconnects the third and fourth ports 443 and 447, and second and third lands 455 and 457 for blocking the connection between the first and second ports 439 and 441. The valve spool 451 is elastically supported by an elastic member 459 for providing resistance against the pressure in the hydraulic pressure chamber 449 to prevent an abrupt change of position by the valve spool 451.

The third clutch valve 81 includes a first port 461 connected to the manual valve 7 via the line 85 to receive drive pressure when the low L range has been selected, a second port 465 connected to a line 463 to supply hydraulic pressure to the sixth friction element 69 in the drive D range, the sixth friction element 69 receiving hydraulic pressure from the fourth band valve 89, a third port 467 interconnecting the 2-3 shift valve 59 and the line 77 to receive hydraulic pressure, and a fourth port 471 for interconnecting both the fifth friction element 67 and a line 469, and the 3-4 shift valve 61 and the line 83.

A valve spool 475 moves within the third clutch valve 81 by hydraulic pressure acting in a hydraulic pressure chamber 473. The valve spool 475 includes a first land 477 which directly receives hydraulic pressure from the hydraulic pressure chamber 473 and interconnects the third and fourth ports 467 and 471, and second and third lands 479 and 481 for blocking the interconnection between the first and second ports 461 and 465. The valve spool 475 is elastically supported by an elastic member 483 which prevents abrupt movement of the valve spool 475 by providing resistance against the hydraulic pressure in the hydraulic pressure chamber 473.

The fourth band valve 89 includes a first port 485 connected to the line 93 to receive drive pressure from the manual valve 7 when the third speed, second speed, and low L ranges are selected, a second port 489 connected to a line 487 to supply pressure to the eighth friction element 95 operating in the low L range, a third port 491 connected to the 3-4 shift valve 61 via the line 87 to receive hydraulic pressure, and a fourth port 495 connected to the sixth friction element 69 via a line 493, the sixth friction element 69 receiving hydraulic pressure from the manual valve 7 through the line 85, and, at the same time, connected to the 4-5 shift valve 63 via the line 91.

To open and close the above ports, a valve spool 499 is moved in a longitudinal direction inside the fourth band valve 89 by hydraulic pressure inside a hydraulic pressure chamber 497. The valve spool 499 includes a first land 501 for interconnecting the third and fourth ports 491 and 495 by directly receiving pressure from the hydraulic pressure chamber 497, and second and third lands 503 and 505 for interrupting the connection between the first and second ports 485 and 489. The valve spool 499 is elastically supported by an elastic member 507 which prevents the abrupt movement of the valve spool 499 by providing resistance against the pressure in the hydraulic pressure chamber 497.

The overdrive unit valve 35 includes a first port 509 connected to the pressure line 21 to receive line pressure when in the neutral N range, a second port 513 connected to a line 511 to supply line pressure to the second friction element 55 which operates in the neutral N range, a third port 515 which receives pressure from the 4-5 shift valve 63 via the line 97, and a fourth port 519 for supplying hydraulic pressure to the seventh friction element 71 via a line 517 when in the fifth speed of the drive D range.

The above ports are opened and closed by a valve spool 523 which moves longitudinally inside the overdrive unit valve 35 by the hydraulic pressure operating in a hydraulic pressure chamber 521. The valve spool 523 includes a first land 525 which directly receives pressure from the hydraulic pressure chamber 521 and interconnects the third and fourth ports 515 and 519, and second and third lands 527 and 529 for blocking the interconnection between the first and second ports 509 and 513. The valve spool 523 is elastically supported by an elastic member 531 which provides resistance against the hydraulic pressure inside the hydraulic pressure chamber 521 to prevent the valve spool 523 from being abruptly moved.

Figure 6:
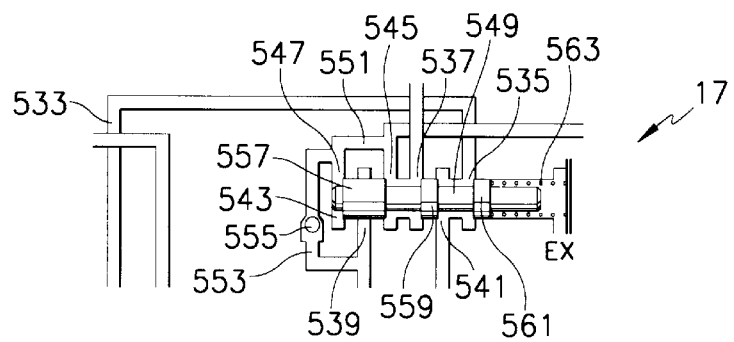
FIG. 6 is a schematic diagram of a N-D control valve used to explain a hydraulic control system for automatic transmissions according to a preferred embodiment of the present invention.

Referring to FIG. 6, there is shown a schematic diagram of the N-D control valve 17. As shown in the drawing, the N-D control valve 17 has a first port 535 connected to a line 533 branched from the pressure line to receive line pressure from the same, a second port 537 connected to the torque pressure line 41, a third port connected to the drive pressure line 39, a fourth port 541 selectively interconnecting the first and second ports 535 and 537 to the line 437, a fifth port 545 providing the torque pressure supplied to the second port 537 to the line 435 which supplies pressure to the third friction element 57, and, at the same time, performing a bypass function with part of the torque pressure from a hydraulic pressure chamber 543, and a sixth port 547 providing the torque pressure bypassed to the fifth port 545 to the hydraulic pressure chamber 543.

The torque pressure is first supplied to the hydraulic pressure chamber 543 as in the above, and if a valve spool 549 is moved to the right inside the N-D control valve 17, the torque pressure is mixed with the drive pressure supplied to the third port 539 to enable control of the valve spool 549.

Namely, the fifth and sixth ports 545 and 547 are interconnected by a line 551 and are connected to the drive pressure line 39 by another line 553. A check valve 555 is provided on the line 553, the check valve 555 stopping the flow of pressure from the drive pressure line 39 to the line 551.

The valve spool 549, moving within the N-D valve 17 by the hydraulic pressure operating in the hydraulic pressure chamber 543 to open and close the above ports, includes a first land 557 having a reaction area on which the hydraulic pressure in the hydraulic pressure chamber 543 acts, a second land 559 selectively communicating the second port 537 with the fourth and fifth ports 541 and 545, and a third land 561 blocking the interconnection between the first and fourth ports 535 and 541. The valve spool 549 is elastically supported by an elastic member 563 which provides resistance against the hydraulic pressure in the hydraulic pressure chamber 543 to prevent the valve spool 549 from being abruptly moved.

The first-seventh solenoid valves S1–S7 are duty or ON/OFF controlled by the TCU depending on road load and engine throttle opening.

In the hydraulic control system for vehicles structured as in the above, when the engine is running, the oil pump 3 is driven mechanically by an engine crankshaft through a torque converter to deliver a steady supply of oil from an oil pan to meet the hydraulic demands of transmission circuits.

Here, the oil supplied from the oil pump 3 is controlled to line pressure by the pressure regulator valve 19, passed through the pressure line 21, then supplied to the solenoid supply pressure line 33 via the solenoid supply valve 31.

Part of the solenoid supply pressure supplied to the solenoid supply line 33 is supplied as control pressure of the first solenoid valve S1, which controls the control switch valve 43; part of the pressure is supplied as control pressure of the second, third, and fourth solenoid valves S2, S3, and S4, which control the 1-2, 2-3, 3-4, and 4-5 shift valves 47, 59, 61, and 63; and another part operates as control pressure of the fifth and sixth solenoid valves S5 and S6, which control the pressure regulator valve 19 and the converter clutch regulator valve 25.

Further, part of the line pressure supplied to the pressure line 21 is supplied to the manual valve 7. In the neutral N range, this line pressure, as shown in FIG. 1, is supplied to the first friction element 53 via the N-D control valve 17 and the second clutch valve 75, and to the second friction element 55 via the overdrive unit valve 35 such that the first and second friction elements 53 and 55 are operated by line pressure in the neutral N range.

In the above state, when a selector lever is positioned at the drive D range, the TCU duty controls the fifth solenoid valve S5 and the hydraulic pressure supplied to the pressure line 21 is controlled to line pressure.

Here, if slipping occurs with the friction elements operating during shifting, the fifth solenoid valve S5 is controlled to OFF by the TCU such that, as shown in FIG. 2, the pressure level in the hydraulic pressure chamber 103 of the pressure regulator valve 19 rises to act on the first land 121 together with the elastic member 117. Accordingly, the valve spool 105 moves to the right.

However, if slipping does not occur with the friction elements operating during shifting, the fifth solenoid valve S5 is duty controlled such that the pressure in the hydraulic pressure chamber 103 is exhausted. As a result, drive pressure, passing through the drive pressure line 39, acts on a right side of the third land 125 to move the valve spool 105 to the left. This causes the second land 123 to be positioned between the first and fifth ports 107 and 115 to interconnect the same such that the oil in the pressure line 21 returns to the oil pan.

Here, if slipping occurs with the friction elements operating during shifting, the fifth solenoid valve S5 is controlled to OFF such that the level of the pressure in the hydraulic pressure chamber 103 rises. Accordingly, the valve spool 105 moves to the right, thereby blocking the fifth port 115 so that the hydraulic pressure in the pressure line 21 is used as operating pressure of the friction elements.

The above operation is continuously repeated according to whether the friction elements are slipping, and in the operation, the first and fourth ports 107 and 113 are interconnected to supply the line pressure in the pressure line 21 to the first port 139 of the converter feed valve 29.

As the valve spool 137 of the converter feed valve 29 is elastically supported by the elastic member 133, the valve spool 137 moves to the right to maintain the first port 139 in a partially open state. As a result, part of the line pressure supplied to the first port 139 is supplied to the converter clutch regulator valve 25 via the second port 141, and part of the pressure is supplied to the hydraulic pressure chamber 129 through the bypass line 145.

The level of the pressure supplied to the hydraulic pressure chamber 129 is raised to overcome the elastic force of the elastic member 133 such that the valve spool 137 is moved to the right to discontinue the supply of pressure to the second port 141. Through this operation, the converter feed valve 29 controls converter clutch control pressure and lubrication control pressure.

The hydraulic pressure supplied to the second port 141 flows to the first port of the converter clutch regulator valve 25 and is supplied to either the line 23a or the line 23b, depending on the ON/OFF operation of the sixth solenoid valve S6. The sixth solenoid valve S6 is controlled to ON by the TCU when the converter clutch is operating, thereby reducing the pressure level in the hydraulic pressure chamber 161.

When the above happens, part of the hydraulic pressure supplied to the first port 147 is supplied to the hydraulic pressure chamber 153 via the fourth and fifth ports 157 and 159.

In the above state, because the hydraulic pressure supplied from the line 27 acts on left and right sides of the second and third lands 171 and 173, having equally-sized reaction areas, the valve spool 167 can not be moved. However, by the acting of hydraulic pressure on the reaction area to the right of the first land 169, the valve spool 167 moves to the left.

When the valve spool 167 is moved as in the above, the second land 171 is positioned to the left of the first port 147, and the first land 169 is positioned to the right of the second port 149 such that the two ports 147 and 149 are interconnected. The pressure supplied through the line 27 then passes through the line 23b and is supplied to the converter clutch of the torque converter 1 to operate the same.

On the other hand, when the converter clutch is not operating, as the fifth solenoid valve S6 is controlled to OFF by the TCU, the pressure level in the hydraulic pressure chamber 161 of the converter clutch regulator valve 25 raises such that the pressure acts on the reaction area to the left of the fourth land 175.

Here, although the pressure in the other hydraulic pressure chamber 153 acts on a reaction area on the right of the first land 169, as the reaction area of the fourth land 175 is larger than that of the first land 169, the valve spool 167 moves to the right.

As a result, the second land 171 is positioned to the right of the first port 147, and the third land 173 is positioned in a center of the third port 151 such that the first and third ports 147 and 151 are interconnected and the hydraulic pressure supplied to the line 27 is supplied through the line 23a to the converter clutch in the torque converter 1 to discontinue the operation of the same.

With regard to the operation and disengagement of the converter clutch, the TCU is input with signals detected by a variety of sensors, and from these signals the TCU determines the operating state of the sixth solenoid valve S6 so as to ascertain whether or not the converter clutch is engaged. This operation will be explained more in detail hereinafter.

[First Speed of Drive D Range]

Figure 7:
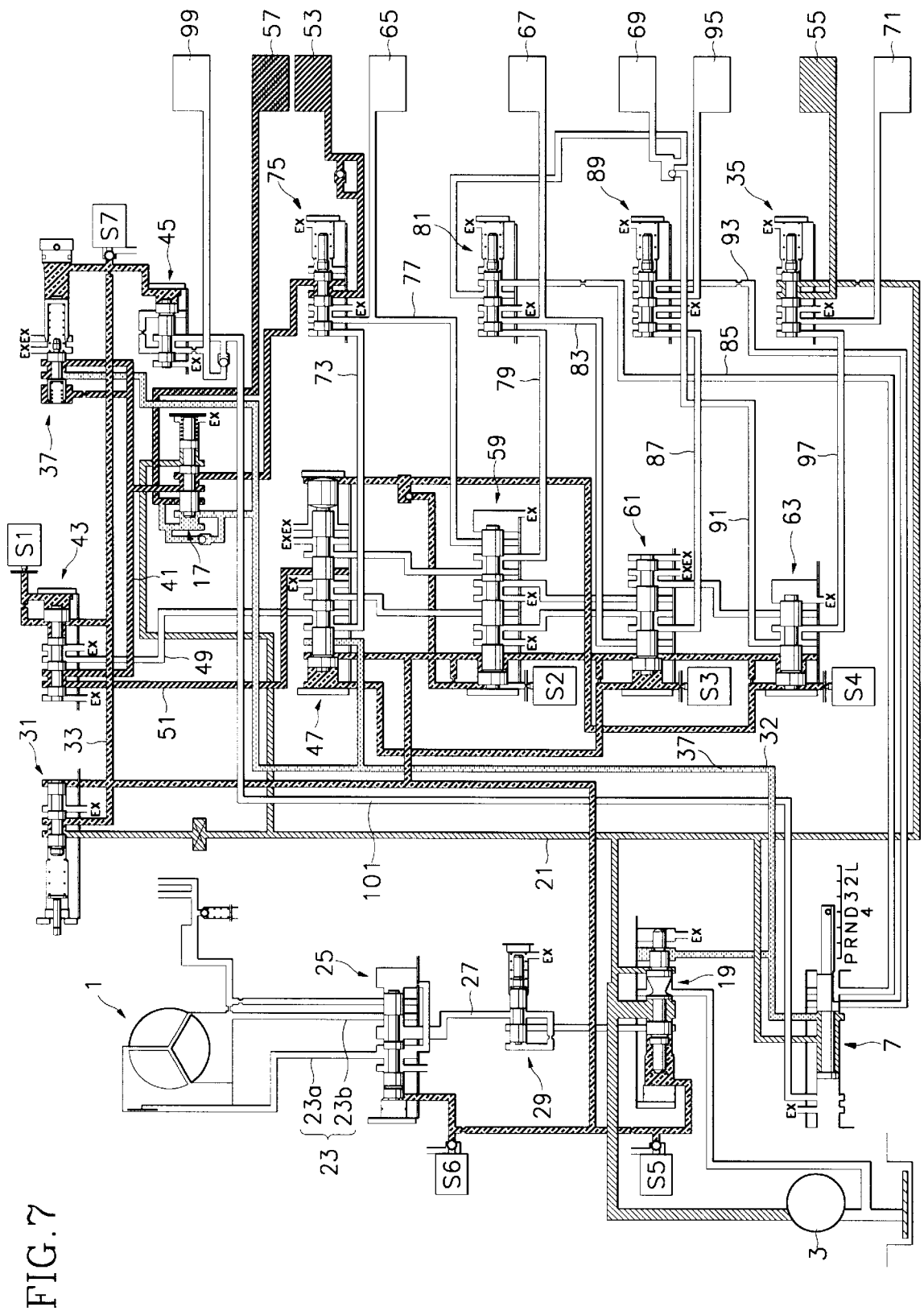
FIG. 7 is a hydraulic circuit diagram of a hydraulic control system in a first speed of a drive D range according to a preferred embodiment of the present invention.

Referring to FIG. 7, shown is a hydraulic circuit diagram of the hydraulic control system in a first speed of the drive D range according to a preferred embodiment of the present invention.

When the driver places the selector lever in the drive D range from the neutral N range, part of the line pressure from the pressure line 21 is used to engage/disengage the converter clutch, as in the above, and the rest of the line pressure is supplied to the solenoid supply valve 31, N-D control valve 17, overdrive unit valve 93, and the manual valve 7.

The line pressure supplied to the manual valve 7 is changed to drive pressure, then, through the ports converted according to the position of the selector lever and via the drive pressure valve 47, is supplied to or stands-by at the fifth port 249 of the 1-2 shift valve 47, is supplied to the second port 199 of the torque control solenoid valve 37, and to the third port 539 of the N-D control valve 17.

Further, part of the line pressure is supplied to the overdrive unit valve 93 to act in the hydraulic pressure chamber 521, provided to one side of the valve spool 523 which is moved to the left by the elastic member 531, such that the pressure level rises to overcome the elastic force of the elastic member 531 and move the valve spool 523 to the right. Accordingly, the first and second ports 509 and 513 of the overdrive unit valve 93 become interconnected and the second friction element 55 continues its operation from the neutral N range.

The line pressure supplied to the solenoid supply valve 31 passes through the same to be reduced to solenoid supply pressure, then passes through the solenoid supply pressure line 33 to be supplied to the hydraulic pressure chambers of the control switch valve 43, the 1-2, 2-3, 3-4, and 4-5 shift valves 47, 59, 61, and 63, the pressure regulator valve 19, the converter clutch regulator valve 25, and the torque control regulator valve 37.

Also, as the third solenoid valve S3 is controlled to OFF by the TCU, the solenoid supply pressure supplied to the 3-4 shift valve 61 via the solenoid supply pressure line is supplied to the hydraulic pressure chamber 261 of the 1-2 shift valve 47 to move the valve spool 273 of the same to the right.

In addition, as the first solenoid valve S1 is controlled to OFF, the solenoid supply pressure supplied to the control switch valve 43 via the solenoid supply pressure line 33 moves the valve spool 231 of the control switch valve 43 to the left.

Accordingly, by the OFF operation of the seventh solenoid valve S7, the torque pressure from the torque control regulator valve 37 is supplied to or stands-by at the second port 243 of the 1-2 shift valve 47 via the line 51 to supply torque pressure to the fourth friction element 45, which operates in the second speed.

As a result, at the beginning of shifting, the torque pressure supplied to the second port 537 of the N-D control valve 17 is supplied to the second clutch valve 75 via the line 437, and, as the valve spool 451 of the second clutch valve 75 is moved to the left by the elastic member 459, the torque pressure is also supplied to the first friction element 53 via the second port 441 to operate the same. At the same time, part of the torque pressure is supplied to the line 435 through the second and fifth ports 537 and 545 of the N-D control valve 17 to operate the third friction element 57 using torque pressure.

The torque pressure supplied to the second port 537 of the N-D control valve 17 passes through the interconnected fifth and sixth ports 545 and 547 to the hydraulic pressure chamber 543 to raise the pressure level in the same. Accordingly, the valve spool 549 is moved to the right to interconnect the third port 539, at which drive pressure is standing by, and the sixth port 547 such that drive pressure is supplied to the line 435 to operate the third friction element 57.

Also, at the end of shifting, the seventh solenoid valve S7 is controlled back to ON by the TCU to discontinue the flow of torque pressure in the torque control regulator valve 37 from the N-D control valve 17 to disengage operation of the first friction element 53, operating by torque pressure.

After finishing the N to D shift process, the second and third friction elements 55 and 57 are operated to realize shifting into the forward first speed.

[Second Speed of Drive D Range]

Figure 8:
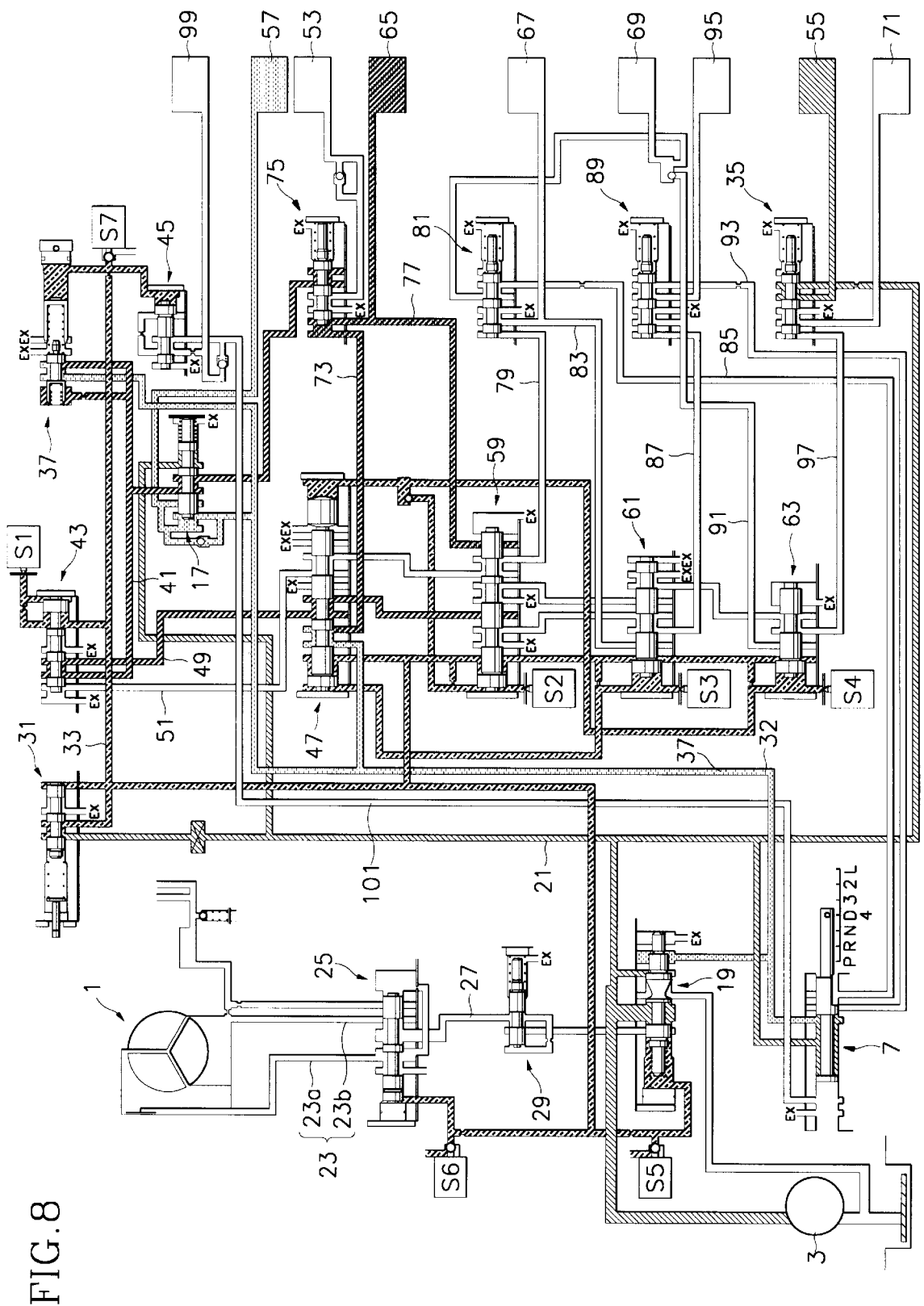
FIG. 8 is a hydraulic circuit diagram of a hydraulic control system in a second speed of the drive D range according to a preferred embodiment of the present invention.

Referring to FIG. 8, shown is a hydraulic circuit diagram of the hydraulic control system in a second speed of the drive D range according to a preferred embodiment of the present invention.

When the throttle opening is increased in the above first speed state, the TCU duty controls the fifth solenoid valve S5 to change line pressure levels, controls the fourth solenoid valve S4 to OFF, the first solenoid valve S1 to OFF, and the seventh solenoid valve S7 to OFF.

Resulting from the seventh solenoid valve S7 being controlled to OFF, the pressure level in the hydraulic pressure chamber 195 in the torque control regulator valve 37 is increased. Accordingly, from the first speed state where the second and third friction elements 55 and 57 are operating, the first valve spool 207 overcomes the elastic force of the first elastic member 209 and, subsequently, the elastic force of the second elastic member 211 such that the second valve spool 217 is moved to the left. As a result, the second and third ports 199 and 203 are interconnected and the drive pressure supplied to the drive pressure line 39 is converted to torque pressure. The torque pressure is then supplied to the second port 536 of the N-D control valve 17 and the second port 223 of the control switch valve 43 via the line 41 connected to the second port 199.

Further, the torque pressure supplied to the second port 223 of the control switch valve 43 moves the valve spool 231 to the right according to the drop in pressure in the hydraulic pressure chamber 229. By this movement of the valve spool 231, the second and third ports 223 and 225 are interconnected such that the torque pressure is supplied to the first port 241 of the 1-2 shift valve 47 via the line 49 connected to the third port 225.

The torque pressure supplied to the first port 241 of the 1-2 shift valve 47 is supplied to the third port 443 of the second clutch valve 75, connected to the sixth port 251 via the line 73, to increase the pressure level in the hydraulic pressure chamber 449 such that the valve spool 451 is moved to the right, overcoming the elastic force of the elastic member 459. As a result, part of this torque pressure is supplied to the fourth friction element 65, connected to the fourth port 447 via the line 445, to operate the same, while another part of the torque pressure is supplied to the third port 295 of the 2-3 shift valve 59, connected to the fourth port 447 via the line 77, and is maintained standing by at the 2-3 shift valve 59 for third speed control.

The solenoid supply pressure supplied through the solenoid supply pressure line 33 moves the valve spools 377 and 401 of the 3-4 and 4-5 shift valve 61 and 63, respectively, to the right by the OFF control of the third and fourth solenoid valves S3 and S4, and, simultaneously, is supplied to both hydraulic pressure chambers 259 and 261 of the 1-2 shift valve 47 through the lines 265 and 375, respectively. Because part of this solenoid supply pressure is supplied to the right side reaction area of the second land 277 through the seventh port 253, the valve spool 273 of the 1-2 shift valve 47 is moved to the left to allow the above supply of pressure.

Accordingly, the fifth and sixth ports 249 and 251 of the 1-2 shift valve 47 are interconnected to supply drive pressure to the line 77 such that the fourth friction element C4 is operated using the drive pressure.

After finishing the above shift process, the first and third friction elements 53 and 55, operated in the first speed of the drive D range, and the fourth friction element 65 are operated to realize shifting into the forward second speed.

[Third Speed of Drive D Range]

Figure 9:
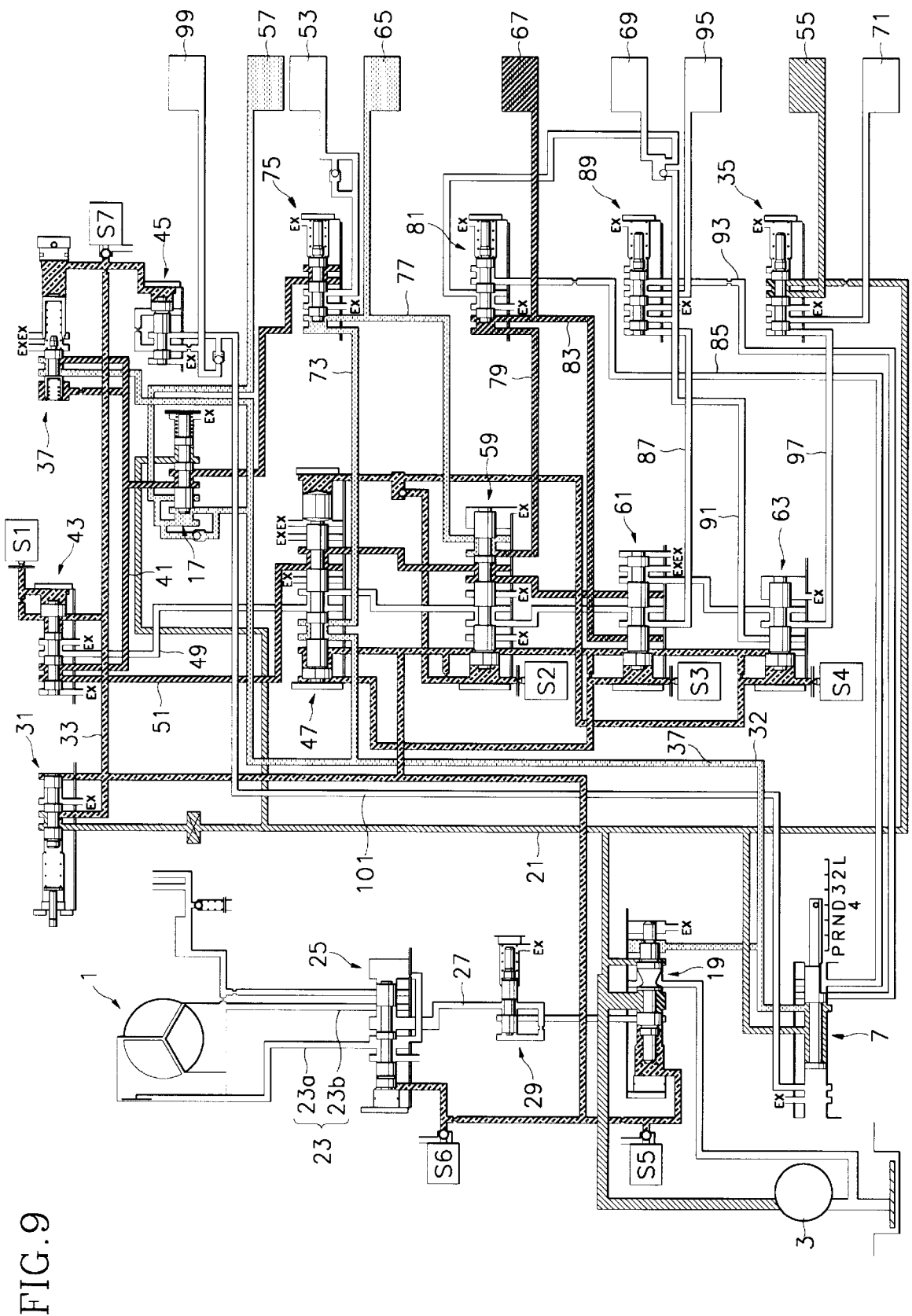
FIG. 9 is a hydraulic circuit diagram of a hydraulic control system in a third speed of the drive D range according to a preferred embodiment of the present invention.

Referring to FIG. 9, shown is a hydraulic circuit diagram of the hydraulic control system in a third speed of the drive D range according to a preferred embodiment of the present invention.

If throttle opening is further increased from the above second speed state, the TCU duty controls the fifth solenoid valve S5 to vary line pressure, controls the second solenoid valve S2 to OFF, the first solenoid valve S1 to OFF, and seventh solenoid valve S7 to OFF.

Resulting from the OFF control of the seventh solenoid valve S7, the pressure level in the hydraulic pressure chamber 195 of the torque control regulator valve 37 is increased. Accordingly, the first, third, and fourth friction elements 53, 55, and 65, operating in the second speed, move the second valve spool 217 to the left by the first valve spool 207 first overcoming the elastic force of the first elastic member 209, then that of the second elastic member 211. As a result, the second and third ports 199 and 203 become interconnected to convert the drive pressure supplied to the drive pressure line 39 to torque pressure. This torque pressure is then supplied to the second port 536 of the N-D control valve 17 and the second port 223 of the control switch valve 43 via the torque pressure line 41.

Further, the torque pressure supplied to the second port 223 of the control switch valve 43 raises the pressure level in the hydraulic pressure chamber 229, by the ON control of the first solenoid valve S1, to move the valve spool 231 to the left. Accordingly, the second and fourth ports 223 and 227 are interconnected and the torque pressure is supplied to the second port 243 of the 1-2 shift valve 47 via the line 51 which is connected to the fourth port 227.

The torque pressure supplied to the second port 243 of the 1-2 shift valve 47 is supplied to the second port 293 of the 2-3 shift valve 59, connected to the fourth port 247 of the 1-2 shift valve 47 via the line 289. The torque pressure then increases the pressure level in the hydraulic pressure chamber 473 of the third clutch valve 81 through the third port 467 of the same, connected to the sixth port 331 of the 2-3 shift valve 59 via the line 79, to move the valve spool 475 of the third clutch valve 81 to the right by overcoming the elastic force of the elastic member 483. As a result, part of the torque pressure is supplied to the fifth friction element 67 connected to the fourth port 471 via the line 469, while another part is supplied to the third port 361 of the 3-4 shift valve 61, connected to the fourth port 471 via the line 83 such that fourth speed control is maintained in a stand-by state.

The solenoid supply pressure supplied through the solenoid supply pressure line 33 moves the valve spools 377 and 401 of the 3-4, 4-5 shift valves 61 and 63, respectively, to the right by the control of the third and fourth solenoid valves S3 and S4 to ON states; is supplied to both hydraulic pressure chambers 259 and 261 of the 1-2 shift valve 47 via the lines 265, 375, and 269 in a state where the valve spool 341 of the 2-3 shift valve 59 is moved to the right by the OFF control of the second solenoid valve S2; and part of the pressure is supplied to the reaction area on a right side of the second land 277 of the 1-2 shift valve via its seventh port 253 such that the valve spool 273 of the same is moved to the left.

As a result of the valve spool 341 of the 2-3 shift valve 59 moving to the right, the fourth land 349 of the valve spool 341 blocks the interconnection between the third and sixth ports 295 and 331 and interconnects the third port 395 and the sixth port 331 such that the drive pressure standing by at the third port 395 is supplied to the sixth port 331.

Accordingly, the drive pressure is supplied to the line 469 connected to the third clutch valve 81 which, in turn, is connected to the sixth port 331 via a line, to operate the fifth friction element 67. Part of this drive pressure is supplied to the third port 361 of the 3-4 shift valve 61, connected to the third clutch valve 81 via the line 83, to convert the torque pressure to drive pressure.

After finishing the above shift process, the second, third, and fourth friction elements 55, 57, and 65, and the fifth friction element 67 are operated to realize shifting into the forward third speed.

[Fourth Speed of Drive D Range]

Figure 10:
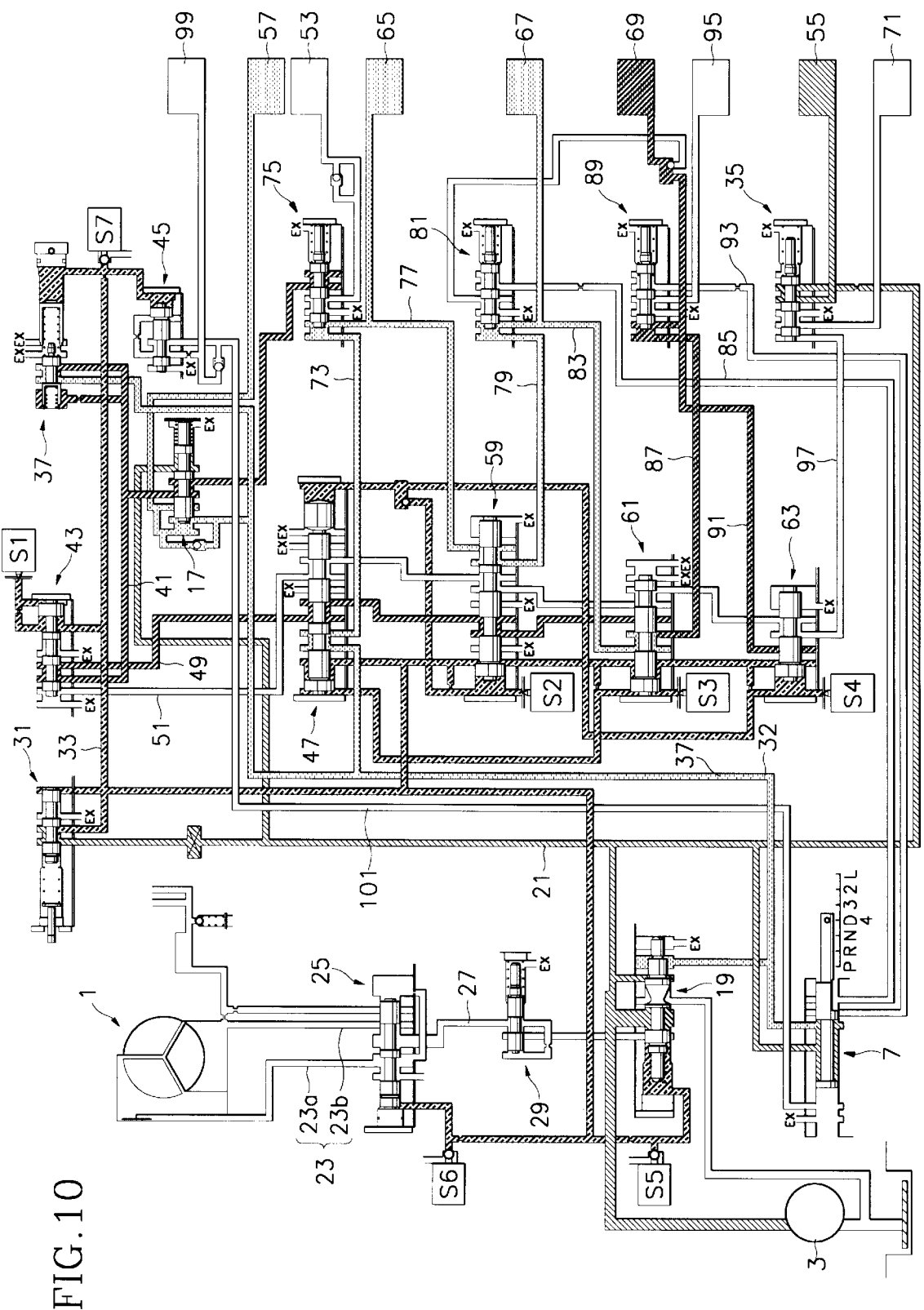
FIG. 10 is a hydraulic circuit diagram of a hydraulic control system in a fourth speed of the drive D range according to a preferred embodiment of the present invention.

Referring to FIG. 10, shown is a hydraulic circuit diagram of the hydraulic control system in a fourth speed of the drive D range according to a preferred embodiment of the present invention.

If throttle opening is further increased from the above third speed state, the TCU duty controls the fifth solenoid valve S5 to vary line pressure, controls the third solenoid valve S3 to ON, the first solenoid valve S1 to ON, and the seventh solenoid valve S7 to OFF.

Resulting from the OFF control of the seventh solenoid valve S7, the pressure level in the hydraulic pressure chamber 195 of the torque control regulator valve 37 is increased. Accordingly, the second, third, fourth, and fifth friction elements 55, 57, 65, and 67 operating in the third speed, move the first valve spool 207 of the torque control regulator valve 37, overcoming the elastic force of the first elastic member 209, and the second valve spool 217, overcoming the elastic force of the second friction member 211, to the left. As a result, the second and third ports 199 and 203 become interconnected to convert the drive pressure supplied to the drive pressure line 39 to torque pressure. This torque pressure is then supplied to the second port 536 of the N-D control valve 17 and the second port 223 of the control switch valve 43 via the torque pressure line 41.

Further, the torque pressure supplied to the second port 223 of the control switch valve 43 raises the pressure level in the hydraulic pressure chamber 229, by the ON control of the first solenoid valve SI, to move the valve spool 231 to the right. Accordingly, the second and third ports 223 and 225 are interconnected, and the torque pressure is supplied to the first port 241 of the 1-2 shift valve 47 via the line 49 which is connected to the third port 225.

The torque pressure supplied to the second port 243 of the 1-2 shift valve 47 is supplied to the first port 291 of the 2-3 shift valve 59, connected to the third port 245 of the 1-2 shift valve 47 via the line 289. The torque pressure is then supplied to the first port 357 of the 3-4 shift valve 61, connected to the fourth port 297 of the 2-3 shift valve 59 via the line 59, and increases the pressure level in the hydraulic pressure chamber 497 of the fourth clutch valve 89 through the third port 491 of the same, connected to the fourth port 363 of the 3-4 shift valve 61 via the line 87 such that the valve spool 499 of the fourth clutch valve 89 is moved to the right by overcoming the elastic force of the elastic member 507. As a result, part of the torque pressure is supplied to the sixth friction element 69 (to operate the same) connected to the fourth port 495 of the third clutch valve 89 via the line 469, while another part is supplied to the second port 391 of the 4-5 shift valve 63, connected to the fourth port 495 via the line 91 such that fifth speed control is maintained at a stand-by state.

The solenoid supply pressure supplied through the solenoid supply pressure line 33 increases the pressure levels in the hydraulic pressure chambers 337 and 397 of the 2-3 and 4-5 shift valves 59 and 63, respectively, by the third solenoid valve S3 being controlled to ON by the TCU in a state where the second and fourth solenoid valves S2 and S4 are in OFF states to move the valve spools 341 and 401 of the 2-3 and 4-5 shift valve 59 and 63, respectively, to the right, and decreases the pressure level in the hydraulic pressure chamber 371 of the 3-4 shift valve 61 to move the valve spool 377 of the same to the left.

Also, part of the above solenoid supply pressure is supplied to the hydraulic pressure chamber 259 of the 1-2 shift valve 47 through the lines 263 and 265, and part is supplied to act on the reaction area to the right of the second land 277 through the seventh port 253. As a result, the valve spool 273 of the 1-2 shift valve 47 is moved to the left to allow the supply of torque pressure as in the above.

When the valve spool 377 of the 3-4 shift valve 61 is moved to the left, the third land 383 of the valve spool 377 blocks the connection between the first and fourth ports 357 and 363, and connects the third and fourth ports 361 and 363 such that the drive pressure standing by at the third port 396 is supplied to the fourth port 363.

Accordingly, the drive pressure is supplied to the sixth friction element 69, operating by torque pressure, connected to the fourth band valve 89 via a line 493, the fourth band valve 89 being connected to the fourth port 363 of the 3-4 shift valve 61 such that the operational pressure of the sixth friction element 69 is changed from torque pressure to drive pressure. Part of this drive pressure is supplied to the second port 391 of the 4-5 shift valve 63 to convert the torque pressure to drive pressure and maintain the same in a fifth speed stand-by state.

After finishing the above shift process, the second, third, fourth, fifth, and sixth friction elements 55, 57, 65, 67, and 69 are operated to realize shifting into the forward fourth speed.

[Fifth Speed of Drive D Range]

Figure 11:
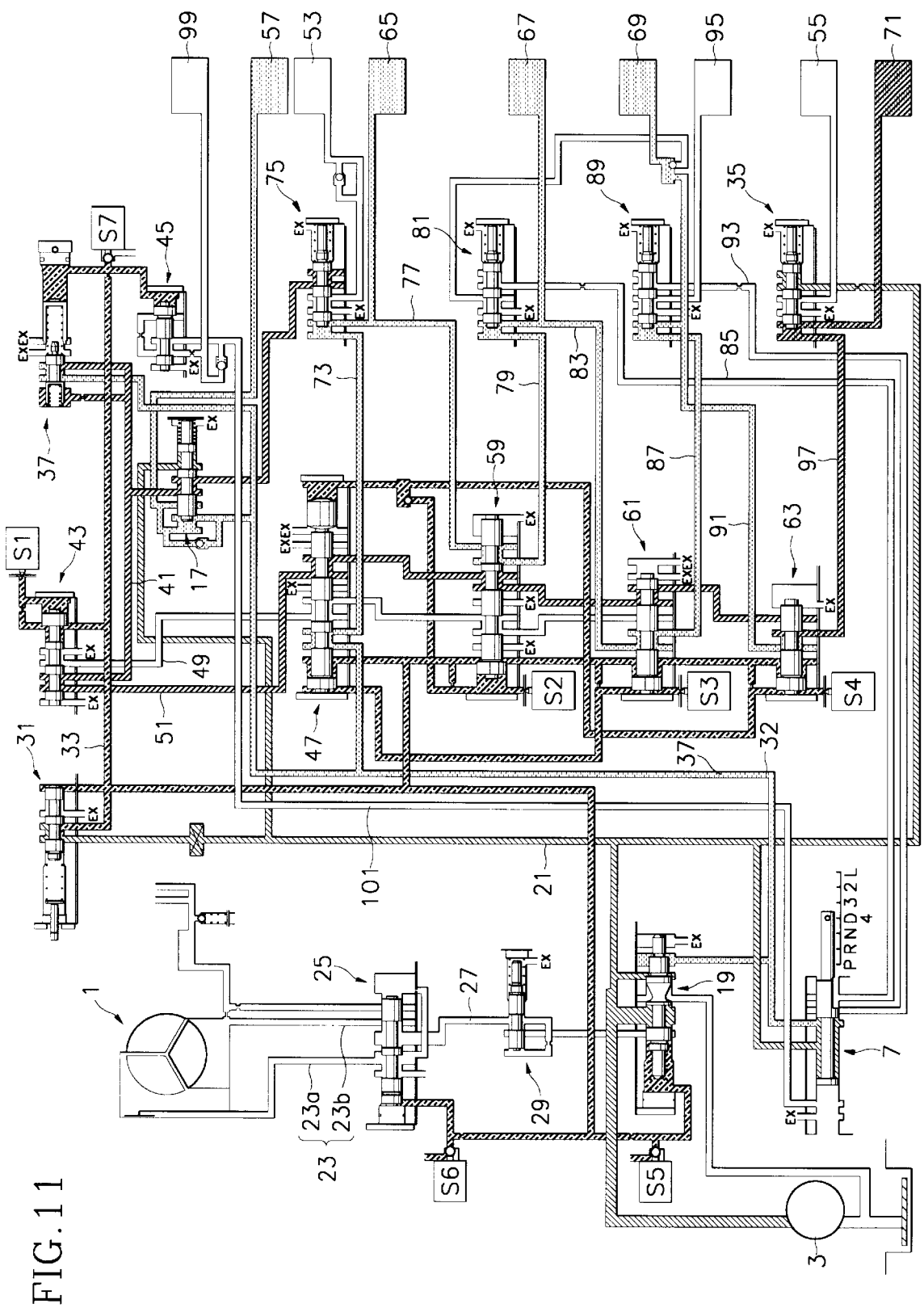
FIG. 11 is a hydraulic circuit diagram of a hydraulic control system in a fifth speed of the drive D range according to a preferred embodiment of the present invention.

Referring to FIG. 11, shown is a hydraulic circuit diagram of the hydraulic control system in a fifth speed of a drive D range according to a preferred embodiment of the present invention.

If throttle opening is further increased from the above fourth speed state, the TCU duty controls the fifth solenoid valve S5 to vary line pressure, controls the fourth solenoid valve S4 to ON, the first solenoid valve S1 to ON, and the seventh solenoid valve S7 to OFF.

Resulting from the OFF control of the seventh solenoid valve S7, the pressure level in the hydraulic pressure chamber 195 of the torque control regulator valve 37 is increased. Accordingly, the second, third, fourth, fifth, and sixth friction elements 55, 57, 65, 67, and 69 operating in the fourth speed, move the first valve spool 207 of the torque control regulator valve 37, overcoming the elastic force of the first elastic member 209, and the second valve spool 217, overcoming the elastic force of the second friction member 211, to the left. As a result, the second and third ports 199 and 203 become interconnected to convert the drive pressure supplied to the drive pressure line 39 to torque pressure. This torque pressure is then supplied to the second port 536 of the N-D control valve 17 and the second port 223 of the control switch valve 43 via the torque pressure line 41.

Further, the torque pressure supplied to the second port 223 of the control switch valve 43 raises the pressure level in the hydraulic pressure chamber 229 by the OFF control of the first solenoid valve S1 to move the valve spool 231 to the left. Accordingly, the second and fourth ports 223 and 227 are interconnected, and the torque pressure is supplied to the second port 243 of the 1-2 shift valve 47 via the line 51 which is connected to the fourth port 227.

The torque pressure supplied to the second port 243 of the 1-2 shift valve 47 is supplied to the second port 293 of the 2-3 shift valve 59, connected to the fourth port 247 of the 1-2 shift valve 47 via the line 289, supplied to the second port 357 of the 3-4 shift valve 61, connected to the fifth port 299 of the 2-3 shift valve 59 via the line 59, and supplied to the third port 393 of the 4-5 shift valve 63 through the first port of the same, connected to the fifth port 365 of the 3-4 shift valve 61 via the line 387.

The above torque pressure is supplied to the hydraulic pressure chamber 521 of the overdrive unit valve 93 through the third port 515 of the same, connected to the third port 393 of the 4-5 shift valve 63 via the line 97, such that the pressure level in the hydraulic pressure chamber 521 is increased to move the valve spool 523 to the right, the valve spool overcoming the elastic force of the elastic member 531. Also, the connection between the first and second ports 509 and 513 of the overdrive unit valve 93 is blocked by the second land 527 of the valve spool 523, and the third and fourth ports 515 and 519 are interconnected.

Accordingly, the line pressure from the pressure line 21 supplied to the line 511 through the first and second ports 509 and 513 to operate the second friction element 55 is exhausted such that the second friction element is disengaged.

In a state where the second solenoid valve S2 is in an OFF state and the third solenoid valve S3 is in an ON state, as the TCU controls the fourth solenoid valve S4 to ON, the solenoid supply pressure supplied through the solenoid supply pressure line 33 increases the pressure level in the hydraulic pressure chamber 337 of the 2-3 shift valve to move the valve spool 341 of the same to the right, decreases the pressure level in the hydraulic pressure chamber 371 of the 3-4 shift valve 61 to move the valve spool 377 of the same to the left, and also decreases the pressure level in the hydraulic pressure chamber 397 of the 4-5 shift valve to move the valve spool 401 of the same to the left.

Also, part of the above solenoid supply pressure is supplied to the hydraulic pressure chamber 259 of the 1-2 shift valve 47 through the line 289, and part is supplied to act on the reaction area on a right side of the second land 277 through the seventh port 253. As a result, the valve spool 273 of the 1-2 shift valve 47 is moved to the left to allow the supply of torque pressure as in the above.

When the valve spool 401 of the 4-5 shift valve 63 is moved to the left, the third land 407 of the valve spool 401 blocks the connection between the first and third ports 389 and 393, and interconnects the second and third ports 391 and 393 such that the drive pressure standing by at the second port 391 is supplied to the third port 363.

Accordingly, the drive pressure is supplied to the seventh friction element 71, operating by torque pressure, connected to the overdrive unit valve 93 via a line 517, the overdrive unit valve 93 being connected to the third port 393 of the 4-5 shift valve 63 via the line 97. As a result, the operational pressure of the seventh friction element 71 is changed from torque pressure to drive pressure.

After finishing the above shift process, the second friction element 55, operating in the fourth speed of drive D, is disengaged, and the third, fourth, fifth, and sixth friction elements 57, 65, 67, and 69, and the seventh friction element 71 are operated to realize shifting into the fifth speed.

[Shifting from $D_4$ to Low L Range]

Figure 12:
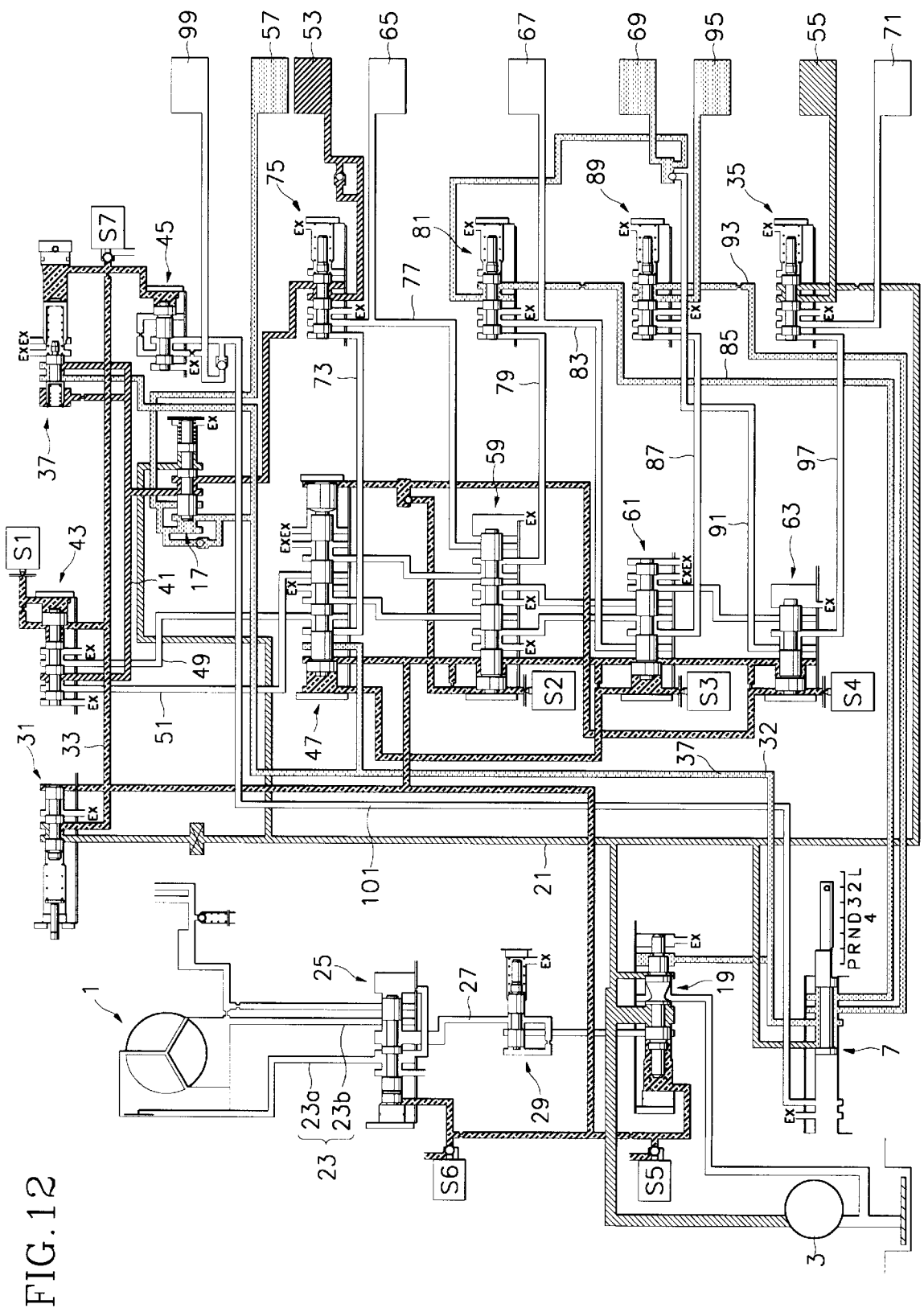
FIG. 12 is a hydraulic circuit diagram of a hydraulic control system in a low L range according to a preferred embodiment of the present invention.

Shifting from $D_4$ to the low L range changes the hydraulic flow from that shown in FIG. 10, the hydraulic circuit diagram of the hydraulic control system in the fourth speed of drive, to that shown in FIG. 12, depicting a hydraulic circuit diagram of the hydraulic control system in the low L range.

In FIG. 12, the second and fourth solenoid valves S2 and S4 are controlled to ON, and the third solenoid valve S3 is controlled to OFF such that the solenoid supply pressure supplied to the solenoid supply line 33 is supplied to the hydraulic pressure chamber 261 of the 1-2 shift valve 47 via the line 269 to raise the pressure level in the chamber 261.

Accordingly, the valve spool 273 of the 1-2 shift valve 47 moves to the right such that the second land 277 of the valve spool 273 is positioned between the fifth port 249, connected to the drive pressure line 39, and the sixth port 251, connected to the line 73, to block the interconnection between the same.

Drive pressure is received from the second clutch valve 75, connected to the line 73, to disengage the fourth friction element 65; drive pressure is received from the third clutch valve 81, connected via the line 79 to the 2-3 shift valve 59 which is connected to the second clutch valve 75 via the line 77, to disengage the fifth friction element 67; and drive pressure is received from the fourth band valve 89, connected via the line 87 to the 3-4 shift valve 61 which is connected to the third clutch valve 81 via the line 83, to disengage the sixth friction element S6.

Simultaneously with the above, drive pressure is supplied to the first port 461 of the third clutch valve 81, connected to the manual valve 7 via the line 85. Here, because the valve spool 273 of the 1-2 shift valve 47 is moved to the right as mentioned above, the drive pressure operating in the hydraulic pressure chamber 473 of the third clutch valve 81 is released. Accordingly, the valve spool 475 of the third clutch valve 81 receives the elastic force of the elastic member 483 to move to the left and interconnect the first and second ports 461 and 465.

As a result, the drive pressure supplied to the first port 461 of the third clutch valve 81 from the manual valve 7 via the line 85 is supplied via the line 463 to the sixth friction element 69 to operate the same.

Further, the above drive pressure is supplied to the first port 485 of the fourth band valve 89, connected to the manual valve 7 through the line 93, and because the valve spool 273 of the 1-2 shift valve 47 moves to the right as in the above, the drive pressure operating in the hydraulic pressure chamber 497 of the fourth band valve 89 is released such that the valve spool 499 of the same moves to the left by the elastic member 507 to interconnect the first and second ports 485 and 489.

Accordingly, the drive pressure supplied to the first port 485 of the fourth band valve 89 from the manual valve 7 via the line 93 is supplied to the eighth friction element 95 via the line 487 to operate the same.

The torque pressure standing by at the first port 439 (by the duty control of the seventh solenoid valve S7) of the second clutch valve 75, connected to the torque control valve 37 via the N-D control valve 17 through the line 427, is supplied to the second port 441 which is interconnected with the first port 439. This is realized by the release of the drive pressure operating in the hydraulic pressure chamber 449 of the second clutch valve 75, as the valve spool 273 of the 1-2 shift valve 47 is moved to the right, such that the valve spool 451 of the second clutch valve 75 is moved to the left by the elastic member 459.

Accordingly, the first friction element 53 is connected to the second port 441 of the second clutch valve 75 to receive pressure therefrom such that the first friction element 53 is operated by torque pressure according to the duty control of the seventh solenoid valve S7.

As in the above, the first, second, third, sixth, and eighth friction elements 53, 55, 57, 69, and 98 are operated such that shifting into the low L range is realized.

Namely, when manually shifting from the fourth speed of the drive D range to the low L range, the second and third friction elements 55 and 57 remain engaged, the fourth and fifth friction elements 65 and 67 are disengaged, the sixth friction element 69 is operated by the drive pressure supplied from the manual valve 7 through the fourth band valve 89, the eighth friction element 95 is operated by the drive pressure supplied from the manual valve 7, and the first friction element 53 is operated by the torque pressure passing through the N-D control valve 17 by the OFF control of the seventh solenoid valve S7.

[Shifting from D₃ to Low L Range]

Shifting from D₃ to the low L range changes the hydraulic flow from that shown in FIG. 9, the hydraulic circuit diagram of the hydraulic control system in the third speed, to that shown in FIG. 12, depicting a hydraulic circuit diagram of the hydraulic control system in the low L range.

In FIG. 12, the second and fourth solenoid valves S2 and S4 are controlled to ON, and the third solenoid valve S3 is maintained to OFF such that the solenoid supply pressure supplied to the solenoid supply line 33 is supplied to the hydraulic pressure chamber 261 of the 1-2 shift valve 47 via the line 269 to raise the pressure level in the chamber 261.

Accordingly, the valve spool 273 of the 1-2 shift valve 47 moves to the right such that the second land 277 of the valve spool 273 is positioned between the fifth port 249, connected to the drive pressure line 39, and the sixth port 251, connected to the line 73, to block the interconnection between the same.

Drive pressure is received from the second clutch valve 75, connected to the line 73, to disengage the fourth friction element 65; and drive pressure is received from the third clutch valve 81, connected via the line 79 to the 2-3 shift valve 59 which is connected to the second clutch valve 75 via the line 77, to disengage the fifth friction element 67.

Simultaneously with the above, drive pressure is supplied to the first port 461 of the third clutch valve 81, connected to the manual valve 7 via the line 85. Here, because the valve spool 273 of the 1-2 shift valve 47 moves to the right as mentioned above, the drive pressure operating in the hydraulic pressure chamber 473 of the third clutch valve 81 is released. Accordingly, the valve spool 475 of the third clutch valve 81 receives the elastic force of the elastic member 483 to move to the left and interconnect the first and second ports 461 and 465.

As a result, the drive pressure supplied to the first port 461 of the third clutch valve 81 from the manual valve 7 via the line 85 is supplied via the line 463 to the sixth friction element 69 to operate the same.

Further, the above drive pressure is supplied to the first port 485 of the fourth band valve 89, connected to the manual valve 7 through the line 93, and because the valve spool 273 of the 1-2 shift valve 47 is moved to the right as in the above, the drive pressure operating in the hydraulic pressure chamber 497 of the fourth band valve 89 is released such that the valve spool 499 of the same moves to the left by the elastic member 507 to interconnect the first and second ports 485 and 489.

Accordingly, the drive pressure supplied to the first port 485 of the fourth band valve 89 from the manual valve 7 via the line 93 is supplied to the eighth friction element 95 via the line 487 to operate the same.

The torque pressure standing by at the first port 439 (by the duty control of the seventh solenoid valve S7) of the second clutch valve 75, connected to the torque control valve 37 via the N-D control valve 17 through the line 427, is supplied to the second port 441 which is interconnected with the first port 439. This is realized by the release of the drive pressure operating in the hydraulic pressure chamber 449 of the second clutch valve 75, as the valve spool 273 of the 1-2 shift valve 47 is moved to the right, such that the valve spool 451 of the second clutch valve 75 is moved to the left by the elastic member 459.

Accordingly, the first friction element 53 is connected to the second port 441 of the second clutch valve 75 to receive pressure therefrom such that the first friction element 53 is operated by torque pressure according to the duty control of the seventh solenoid valve S7.

As in the above, the first, second, third, sixth, and eighth friction elements 53, 55, 57, 69, and 98 are operated such that shifting into the low L range is realized.

Namely, when manually shifting from the third speed of the drive D range to the low L range, the second and third friction elements 55 and 57 remain engaged, the fourth and fifth friction elements 65 and 67 are disengaged, the sixth friction element 69 is operated by the drive pressure supplied from the manual valve 7 through the fourth band valve 89, the eighth friction element 95 is operated by the drive pressure supplied from the manual valve 7, and the first friction element 53 is operated by the torque pressure passing through the N-D control valve 17 by the OFF control of the seventh solenoid valve S7.

[Shifting from D₂ to Low L Range]

Shifting from D₂ to the low L range changes the hydraulic flow from that shown in FIG. 8, the hydraulic circuit diagram of the hydraulic control system in the second speed, to that shown in FIG. 12, depicting a hydraulic circuit diagram of the hydraulic control system in the low L range.

In FIG. 12, the second solenoid valves S2 is maintained in an ON state, the third solenoid valve S3 is maintained to OFF, and the fourth solenoid valve S4 is controlled to ON such that the solenoid supply pressure supplied to the solenoid supply line 33 is supplied to the hydraulic pressure chamber 261 of the 1-2 shift valve 47 via the line 269 to raise the pressure level in the chamber 261.

Accordingly, the valve spool 273 of the 1-2 shift valve 47 moves to the right such that the second land 277 of the valve spool 273 is positioned between the fifth port 249, connected to the drive pressure line 39, and the sixth port 251, connected to the line 73, to block the interconnection between the same.

Drive pressure is received from the second clutch valve 75, connected to the line 73, to disengage the fourth friction element 65, and, at the same time, drive pressure is supplied to the first port 461 of the third clutch valve 81, connected to the manual valve 7 via the line 85, and as the valve spool 273 of the 1-2 shift valve 47 is moved to the right, the drive pressure operating in the hydraulic pressure chamber 473 of the third clutch valve 81 is released. Accordingly, the valve spool 475 of the third clutch valve 81 receives the elastic force of the elastic member 483 to move to the left and interconnect the first and second ports 461 and 465.

As a result, the drive pressure supplied to the first port 461 of the third clutch valve 81 from the manual valve 7 via the line 85 is supplied via the line 463 to the sixth friction element 69 to operate the same.

Further, the above drive pressure is supplied to the first port 485 of the fourth band valve 89, connected to the manual valve 7 through the line 93, and because the valve spool 273 of the 1-2 shift valve 47 is moved to the right as in the above, the drive pressure operating in the hydraulic pressure chamber 497 of the fourth band valve 89 is released such that the valve spool 499 of the same moves to the left by the elastic member 507 to interconnect the first and second ports 485 and 489.

Accordingly, the drive pressure supplied to the first port 485 of the fourth band valve 89 from the manual valve 7 via the line 93 is supplied to via the line 487 to the eighth friction element 95 to operate the same.

The torque pressure standing by at the first port 439 (by the duty control of the seventh solenoid valve S7) of the second clutch valve 75, connected to the torque control valve 37 via the N-D control valve 17 through the line 427, is supplied to the second port 441 which is interconnected with the first port 439. This is realized by the release of the drive pressure operating in the hydraulic pressure chamber 449 of the second clutch valve 75, as the valve spool 273 of the 1-2 shift valve 47 is moved to the right, such that the valve spool 451 of the second clutch valve 75 is moved to the left by the elastic member 459.

Accordingly, the first friction element 53 is connected to the second port 441 of the second clutch valve 75 to receive pressure therefrom such that the first friction element 53 is operated by torque pressure according to the duty control of the seventh solenoid valve S7.

As in the above, the first, second, third, sixth, and eighth friction elements 53, 55, 57, 69, and 98 are operated such that shifting into the low L range is realized.

Namely, when manually shifting from the second speed of the drive D range to the low L range, the second and third friction elements 55 and 57 remain engaged, the fourth friction element 65 is disengaged, the sixth friction element 69 is operated by the drive pressure supplied from the manual valve 7, the eighth friction element 95 is operated by the drive pressure supplied from the manual valve 7, and the first friction element 53 is operated by the torque pressure passing through the N-D control valve 17 by the OFF control of the seventh solenoid valve S7.

[First Speed of Third Range]

When the selector lever is positioned at a third range by the user, the TCU controls each solenoid valve as in the first speed of the drive D range such that drive pressure is supplied to the fourth band valve 89, connected to the manual valve 7 via the line 93, to supply the drive pressure via the line 487 to the eighth friction element 95 to operate the same.

Namely, the eighth friction element 95 is additionally operated to the state shown in FIG. 7 illustrating the hydraulic control system in the first speed of the drive D range.

[Second Speed of Third Range]

In the above first speed state of the third range, if throttle opening is increased, the TCU controls each solenoid valve as in the second speed of the drive D range, maintaining the eighth friction element 95 in an operating state as in the first speed of the third range.

Namely, the eighth friction element 95 is additionally operated to the state shown in FIG. 8 illustrating the hydraulic control system in the second speed of the drive D range.

[Third Speed of Third Range]

Figure 13:
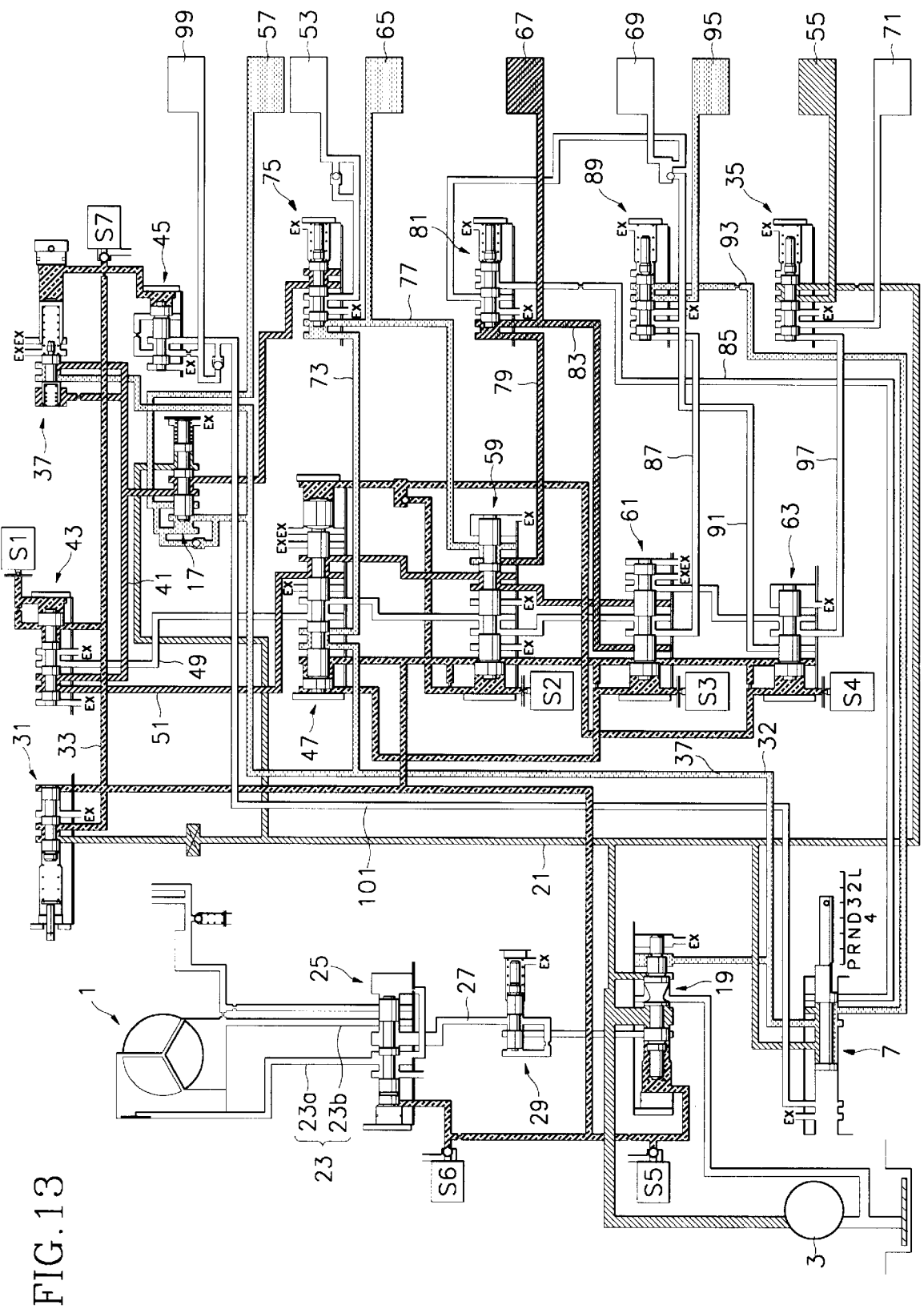
FIG. 13 is a hydraulic circuit diagram of a hydraulic control system in a third speed of a third range according to a preferred embodiment of the present invention.

Referring to FIG. 13, shown is a hydraulic circuit diagram of a hydraulic control system in a third speed of the third range according to a preferred embodiment of the present invention.

In the above second speed state of the third range, if throttle opening is increased, the TCU controls each solenoid valve as in the third speed of the drive D range, maintaining the eighth friction element 95 in an operating state as in the first and second speeds of the third range.

Namely, the eighth friction element 95 is additionally operated to the state shown in FIG. 9 illustrating the hydraulic control system in the third speed of the drive D range.

[First Speed of Third Range to Low L Range]

As manually shifting from the first speed of the third range to the low L range is identical to that when shifting from the first speed of the drive D range to the low L range except for the operating of the eighth friction element 95 by the drive pressure supplied from the manual valve 7, a detailed description thereof will be omitted.

[Second Speed of Third Range to Low L Range]

As manually shifting from the second speed of the third range to the low L range is identical to that when shifting from the second speed of the drive D range to the low L range except for the operating of the eighth friction element 95 by the drive pressure supplied from the manual valve 7, a detailed description thereof will be omitted.

[Third Speed of Third Range to Low L Range]

As manually shifting from the third speed of the third range to the low L range is identical to that when shifting from the third speed of the drive D range to the low L range except for the operating of the eighth friction element 95 by the drive pressure supplied from the manual valve 7, a detailed description thereof will be omitted.

[First Speed of Second Range]

When the selector lever is positioned at a second range by the user, the TCU controls each solenoid valve as in the first speed of the drive D range, the sixth friction element 69 is operated by the drive pressure supplied from the manual valve 7 through the third clutch valve 81 via the line 85, and drive pressure is supplied to the fourth band valve 89 connected to the manual valve 7 via the line 93 to operate the eighth friction element 95, connected to the fourth band valve 89 via the line 487.

Namely, the sixth and eighth friction elements 69 and 95 are additionally operated to the state shown in FIG. 7 illustrating the hydraulic control system in the first speed of the drive D range.

[Second Speed of Second Range]

Figure 14:
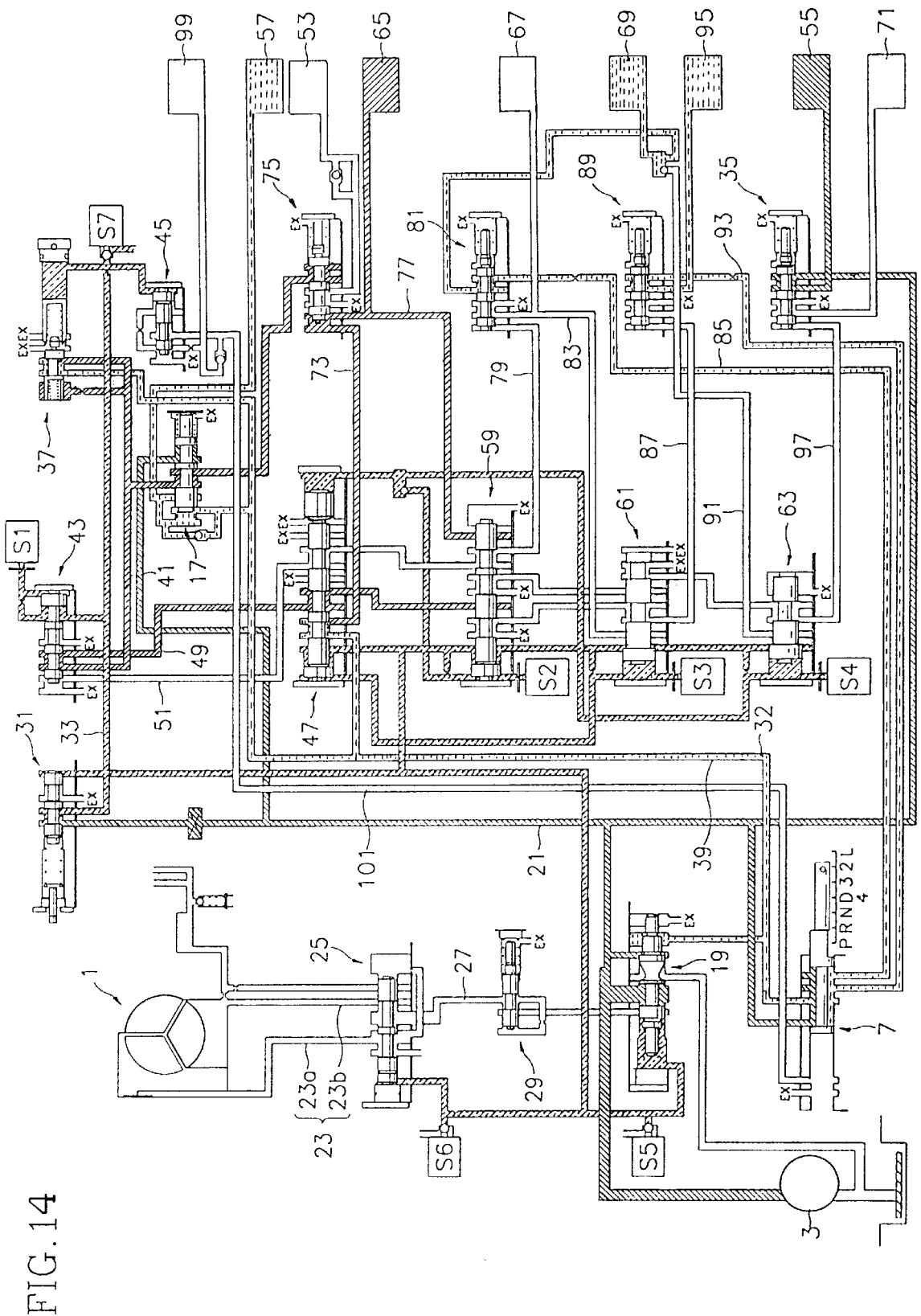
FIG. 14 is a hydraulic circuit diagram of a hydraulic control system in a second speed of a second range according to a preferred embodiment of the present invention.

FIG. 14 is a hydraulic circuit diagram of the hydraulic control system in a second speed of a second range according to a preferred embodiment of the present invention.

If throttle opening is further increased from the above state in the first speed of the second range, the TCU controls each solenoid valve as in the second speed of the drive D range, and the sixth and eighth friction elements 69 and 95 are maintained in operating states.

Namely, the sixth and eighth friction elements 69 and 95 are additionally operated to the state shown in FIG. 7 illustrating the hydraulic control system in the second speed of the drive D range.

[Second Speed of Second Range to Low L Range]

As manually shifting from the second speed of the second range to the low L range is identical to that when shifting from the second speed of the drive D range to the low L range except for the operating of the sixth and eighth friction elements 69 and 95 by the drive pressure supplied from the manual valve 7, a detailed description thereof will be omitted.

[First Speed of Second Range to Low L Range]

As manually shifting from the first speed of the second range to the low L range is identical to that when shifting from the first speed of the drive D range to the low L range except for the operating of the sixth and eighth friction elements 69 and 95 by the drive pressure supplied from the manual valve 7, a detailed description thereof will be omitted.

In the above hydraulic control system for automatic transmissions, as the N-D control valve is added and in the neutral N range the first and second friction elements are operated by line pressure; and as the seventh solenoid valve is controlled to OFF and the third friction element is first operated by torque pressure then by drive pressure, and the first friction element is operated using torque pressure when manually shifting from the neutral N range to the drive D range and from the drive D range to the low L range, the precision and responsiveness of friction element control is improved.

In this disclosure, there is shown and described only the preferred embodiment of the invention, but, as aforementioned, it is to be understood that the invention is capable of use in various other combinations and environments and is capable of changes or modification within the scope of the inventive concepts expressed herein.

What is claimed is:

1. A hydraulic control system, comprising:

an oil pump including a drive gear rotating together with an engine and a driven gear meshed and rotating with the drive gear;

a pressure regulator valve receiving hydraulic pressure from the oil pump and which varies the hydraulic pressure to suitable levels for forward and reverse driving;

a torque converter mounted between a crankshaft of an engine and a transmission and which converts engine power to torque;

a converter clutch regulator valve supplying converter clutch operational pressure through a converter feed valve to increase power transmission efficiency of the torque converter;

a solenoid supply valve receiving line pressure from the pressure regulator valve to reduce the line pressure to solenoid supply pressure and supplying the same to first, second, third, fourth, fifth, sixth, and seventh solenoid valves;

a manual valve a position of which is indexed by a selector lever and which converts the line pressure from the pressure regulator valve to drive pressure;

a torque control regulator valve for converting and supplying the drive pressure from the manual valve to friction elements in each shift stage;

first, second, third, fourth, fifth, sixth, seventh, eighth, and ninth friction elements, at least one of the friction elements are operated to control each stage of a multi-stage gearshift mechanism;

a control switch valve for determining where the torque pressure supplied from the torque control regulator valve will be supplied;

1-2, 2-3, 3-4, and 4-5 shift valves receiving either torque pressure from the torque control regulator valve or line pressure from the pressure regulator valve by the ON/OFF control of the first, second, third, and fourth solenoid valves, and selectively supplying drive pressure from the manual valve to the friction elements to for shifting;

second and third clutch valves, a fourth band valve, and an overdrive unit valve controlled by torque pressure from the torque control regulator valve, the torque control regulator valve supplies drive pressure to friction elements in each shift range, and, also supplies drive pressure of a subsequent shift stage to the shift valves; and a N-D control valve which receives line pressure from the pressure regulator valve, drive pressure from the manual valve, and torque pressure from the torque control regulator valve to control the first friction element using line pressure in a neutral N range, to control the first friction element using torque pressure and to control the third friction element using first torque pressure then drive pressure when shifting from the neutral N range to a drive D range.

2. The hydraulic control system according to claim 1, wherein the ninth friction element is a reverse friction element connected to the manual valve via a reverse pressure line to receive reverse drive pressure from the manual valve.

3. The hydraulic control system according to claim 1, wherein a reverse clutch inhibitor valve is provided on the reverse pressure line to prevent reversing of a vehicle by stopping oil flow to the ninth friction element when shifting to a reverse R range from the drive D range.

4. The hydraulic control system according to claim 1, wherein the manual valve includes a park P range, the reverse R range, the neutral N range, the drive D range, a third speed range, a second speed range, and a low L range.

5. The hydraulic control system according to claim 1, wherein the torque control regulator valve comprises:

a hydraulic pressure chamber receiving pressure regulated by the seventh solenoid valve;

a first valve spool provided in the hydraulic pressure chamber;

a second valve spool for selectively cutting off the torque pressure supplied to the control switch valve and the N-D control valve;

a first elastic member interposed between the first and second valve spools to elastically support the same; and a second elastic members supporting only the second valve spool and having an elastic force smaller than that of the first elastic member.

6. The hydraulic control system according to claim 1, wherein the control switch valve comprises:

a hydraulic pressure chamber receiving hydraulic pressure regulated by the first solenoid valve; and a valve spool selecting lines to which torque pressure from the 1-2 shift valve is supplied.

7. The hydraulic control system of claim 1, wherein the 1-2 shift valve comprises:

first and second ports selectively receiving torque pressure from the control switch valve by the ON/OFF control of the first solenoid valve;

third and fourth ports supplying the received torque pressure from the first and second ports to the 2-3 shift valve;

a fifth port receiving drive pressure from the manual valve;

a sixth port selectively supplying the torque pressure supplied to the first port and the drive pressure supplied to the fifth port to the second clutch valve;

a seventh port connected to the solenoid supply valve to receive solenoid supply pressure;

an eighth port receiving solenoid supply pressure by ON/OFF control of the second and fourth solenoid valves;

a ninth port receiving solenoid supply pressure by the ON/OFF control of the third solenoid valve; and a valve spool selectively opening and closing the ports by ON/OFF control of the first solenoid valve.

8. The hydraulic control system of claim 1, wherein ,the 2-3 shift valve comprises:

first and second ports selectively receiving torque pressure from the third and fourth ports of the 1-2 shift valve;

a third port receiving torque pressure and drive pressure from the second clutch valve;

a fourth port supplying the torque pressure supplied to the first port to the 3-4 shift valve;

a fifth ports supplying torque pressure supplied to the second ports to the 3-4 shift valve;

a sixth port supplying the torque pressure supplied to the second port and the drive pressure supplied to the third port to the third clutch valve;

a seventh port receiving solenoid supply pressure from the solenoid supply valve;

an eighth port supplying the solenoid supply pressure supplied to the seventh port to the 3-4 shift valve;

a ninth port 339 receiving part of the solenoid supply pressure supplied to the seventh port such that ON/OFF control of the second solenoid valve is received, the ninth port being connected to the eighth port of the 1-2 shift valve; and a valve spool selectively opening and closing the ports according to pressure changes in a hydraulic pressure chamber realized by either an increase or decrease in the level of solenoid supply pressure by the ON/OFF control of the second solenoid valve.

9. The hydraulic control system of claim 1, wherein the 3-4 shift valve comprises:

first and second ports selectively receiving torque pressure from the fourth and fifth ports of the 2-3 shift valve;

a third port receiving torque pressure and drive pressure from the third clutch valve;

a fourth port supplying the torque pressure supplied from the first port and the drive pressure supplied from the third port to the fourth band valve;

a fifth port supplying the torque pressure supplied to the second port to the 4-5 shift valve;

a sixth port connected to the eighth port of the 2-3 shift valve to supply the solenoid supply pressure from the solenoid supply valve thereto;

a seventh port supplying the solenoid supply pressure supplied to the sixth port to the 4-5 shift valve;

an eighth port for receiving part of the pressure fed to the sixth port, the eighth port being connected to the ninth port of the 1-2 shift valve; and a valve spool for selectively opening and closing the ports by pressure changes in a hydraulic pressure chamber, the level of pressure therein either increasing or decreasing by the ON/OFF control of the third solenoid valve.

10. The hydraulic control system according to claim 1, wherein the 4-5 shift valve comprises:

a first port receiving torque pressure from the fifth port of the 3-4 shift valve;

a second port receiving torque pressure and drive pressure from the fourth clutch valve;

a third port for selectively supplying the torque pressure supplied to the first port and the drive pressure supplied to the second port to the overdrive unit valve;

a fourth port connected to the seventh port of the 3-4 shift valve to supply the solenoid supply pressure from the solenoid supply valve thereto;

a fifth port connected to the eighth port of the 1-2 shift valve and which receives part of the solenoid supply pressure supplied to the fourth port; and a valve spool for selectively opening and closing the ports by pressure changes in a hydraulic pressure chamber, the level of pressure therein either increasing or decreasing by the ON/OFF control of the third solenoid valve.

11. The hydraulic control system of claim 1, wherein the second clutch valve comprises:

a first port for selectively receiving torque pressure and line pressure from the N-D control valve;

a second port for supplying the torque pressure and drive pressure supplied to the first port to the first friction element;

a third port selectively receiving torque pressure and drive pressure from the 1-2 shift valve;

a fourth port for supplying the torque pressure and drive pressure supplied to the third port to the fourth friction element and the 2-3 shift valve; and a valve spool for selectively opening and closing the ports by the torque pressure and drive pressure and which is elastically supported by an elastic member.

12. The hydraulic control system according to claim 1, wherein the third clutch valve comprises:

a first port for receiving drive pressure from the manual valve;

a second port for supplying the drive pressure supplied to the first port to the sixth friction element;

a third port for selectively receiving torque pressure and drive pressure supplied to the 2-3 shift valve;

a fourth port which supplies the torque pressure and the drive pressure supplied to the third port to the 3-4 shift valve; and a valve spool selectively opening and closing the ports by the torque pressure and drive pressure supplied to the third port and which is elastically supported by an elastic member.

13. The hydraulic control system according to claim 1, wherein the fourth band valve comprises:

a first port receiving drive pressure from the manual valve;

a second port for supplying the drive pressure received by the first port to the eighth friction element;

a third port for selectively receiving torque pressure and drive pressure from the 3-4 shift valve;

a fourth port for supplying the torque pressure and the drive pressure supplied to the third port to the 4-5 shift valve; and a valve spool for selectively opening and closing the ports by the torque pressure and drive pressure and which is elastically supported by an elastic member.

14. The hydraulic control system according to claim 1, wherein the overdrive unit valve comprises:
   a first port for receiving line pressure from the pressure regulator valve;
   a second port for supplying the line pressure received by the first port to the second friction element;
   a third port for selectively receiving torque pressure and drive pressure supplied to the 4-5 shift valve;
   a fourth port for supplying the torque pressure and drive pressure supplied to the third port to the seventh friction element; and
   a valve spool for selectively opening and closing the ports by the torque pressure and drive pressure supplied to the third port and which receives elastic force from an elastic member.

15. The hydraulic control system according to claim 1, wherein the N-D control valve comprises:
   a first port receiving line pressure from the pressure regulator valve;
   a second port receiving torque pressure from the torque control regulator valve;
   a third port for receiving drive pressure from the manual valve;
   a fourth port for selectively supplying the line pressure and torque pressure supplied to the first and second ports to the second clutch valve;
   a fifth port for supplying the torque pressure received by the second port to the third friction element;
   a sixth port for supplying the drive pressure supplied to the third port to the third friction element; and
   a valve spool for opening and closing the ports by the torque pressure supplied to the sixth port through the second and fifth ports, the valve spool being elastically supported by an elastic member.

16. The hydraulic control system according to claim 1, wherein the manual valve allows shifting into the neutral N, drive D, third speed, second speed, and low L ranges.

17. The hydraulic control system according to claim 16, wherein the first and second friction elements directly receive line pressure from the pressure regulator valve in the neutral N range.

18. The hydraulic control system according to claim 16, wherein in a first speed of the drive D range, the second friction element is maintained operating as in the neutral N range, the third friction element is operated, and the first friction element is disengaged, the first friction element being first operated by torque pressure, when the third friction element is operated by drive pressure from torque pressure during shifting into the first speed of the drive D range from the neutral N range, then disengaged when shifting into the first speed is completed.

19. The hydraulic control system according to claim 16, wherein the third friction element controls the seventh solenoid valve to OFF to allow control by drive pressure from torque pressure by the N-D control valve.

20. The hydraulic control system according to claim 16, wherein in a second speed of the drive D range, the fourth friction element is operated with the friction elements operated in the first speed of the drive D range, and the third and fourth solenoid valves, controlling the 1-2 shift valve, are OFF controlled, and the first solenoid valve, controlling the control switch valve, is ON controlled such that the fourth friction element is operated first by torque pressure then by drive pressure.

21. The hydraulic control system according to claim 1, wherein in a third speed of the drive D range, the fifth friction element is operated with the friction elements operating in the second speed of the drive D range, and the second solenoid valve, controlling the 2-3 shift valve, is OFF controlled, and the first solenoid valve, operating the control switch valve, is OFF controlled such that the fifth friction element is first operated by torque pressure then drive pressure.

22. The hydraulic control system according to claim 16, wherein in a fourth speed of the drive D range, the sixth friction element is operated with the friction elements operating in the third speed of the drive D range, and the third solenoid valve, controlling the 3-4 shift valve, is controlled to ON, and the first solenoid valve, controlling the control switch valve, is controlled to ON such that the sixth friction element is first operated by torque pressure then drive pressure.

23. The hydraulic control system according to claim 16, wherein in a fifth speed of the drive D range, the third, fourth, fifth, and sixth friction elements, operating in the fourth speed, are maintained operating, the second friction element is disengaged, and the seventh friction element is operated, the seventh friction element being first operated by torque pressure then by drive pressure by the ON control of the fourth solenoid valve, controlling the 4-5 shift valve, and the OFF control of the first solenoid valve, controlling the control switch valve.

24. The hydraulic control system according to claim 16, wherein in the low L range, the second friction is operated by line pressure supplied from the pressure regulator valve, the sixth and eighth friction elements are operated by drive pressure supplied from the manual valve, and the third friction element is operated by torque pressure supplied to the N-D control valve through the torque control regulator valve by the OFF control of the seventh solenoid valve, after which the first friction element is operated by torque pressure.

25. The hydraulic control system according to claim 16, wherein when shifting from the fourth speed of the drive D range to the low L range, the second and third friction elements are maintained in operating states, the second and fourth solenoid valves are OFF controlled to disengage the fourth and fifth friction elements, the sixth friction element is operated by the release of drive pressure supplied through the fourth band valve and the drive pressure supplied from the manual valve, the eighth friction element is operated by drive pressure supplied from the manual valve, and the seventh solenoid valve is OFF controlled to allow the first friction element to be operated by torque pressure supplied through the N-D control valve.

26. The hydraulic control system according to claim 16, wherein when shifting from the third speed of the drive D range to the low L range, the second and third friction elements are maintained operating; the second, third, and fourth solenoid valves are OFF controlled to disengage the fourth and fifth friction elements; the sixth and eighth friction elements are operated by drive pressure directly received from the manual valve; and to operate the first friction element, the seventh solenoid valve is OFF controlled by torque pressure supplied through the N-D control valve.

27. The hydraulic control system according to claim 16, wherein when shifting from the second speed of the drive D range to the low L range, the second and third friction elements are maintained in operating states, the third and fourth solenoid valves are OFF controlled to disengage the fourth friction element, the sixth and eighth friction elements directly receive drive pressure from the manual valve to be operated, and the seventh solenoid valve is OFF controlled by torque pressure supplied from the N-D control valve to operate the first friction element.

28. The hydraulic control system according to claim 16, wherein when shifting into a first speed of a third range, each solenoid valve is controlled as in the first speed of the drive D range, and the eighth friction element is operated by drive pressure supplied from the manual valve via the fourth band valve.

29. The hydraulic control system according to claim 16, wherein when shifting to a second speed of the third range, each solenoid valve is controlled as in the second speed of the drive D range, and the eighth friction element is operated by drive pressure supplied from the manual valve via the fourth band valve.

30. The hydraulic control system according to claim 16, wherein when shifting to a third speed of the third range, each solenoid valve is controlled as in the third speed of the drive D range, and the eighth friction element is operated by drive pressure supplied from the manual valve via the fourth band valve.

31. The hydraulic control system according to claim 16, wherein when shifting from the first speed of the third range to the low L range, shift control is identical to that when shifting from the first speed of the drive D range to the low L range except the eighth friction element is operated by drive pressure supplied from the manual valve.

32. The hydraulic control system according to claim 16, wherein when shifting from the second speed of the third range to the low L range, shift control is identical to that when shifting from the second speed of the drive D range to the low L range except the eighth friction element is operated by drive pressure supplied from the manual valve.

33. The hydraulic control system according to claim 16, wherein when shifting from the third speed of the third range to the low L range, shift control is identical to that when shifting from the third speed of the drive D range to the low L range except the eighth friction element is operated by drive pressure supplied from the manual valve.

34. The hydraulic control system according to claim 16, wherein when shifting into a first speed of a second range, each solenoid valve is controlled as in the first speed of the drive D range, the fifth friction element is operated by drive pressure supplied from the manual valve through the third clutch valve, and the eighth friction is operated by drive pressure supplied through the fourth band valve.

35. The hydraulic control system according to claim 16, wherein when shifting into a second speed of the second range, each solenoid valve is controlled as in the second speed of the drive D range, the fifth friction element is operated by drive pressure supplied from the manual valve through the third clutch valve, and the eighth friction is operated by drive pressure supplied through the fourth band valve.

36. The hydraulic control system according to claim 16, wherein when shifting from the first speed of the second range to the low L range, shift control is identical to that when shifting from the first speed of the drive D range to the low L range except for the operating of the sixth and eighth friction elements by the drive pressure supplied from the manual valve.

37. The hydraulic control system according to claim 16, wherein when shifting from the second speed of the second range to the low L range, shift control is identical to that when shifting from the second speed of the drive D range to the low L range except for the operating of the sixth and eighth friction elements by the drive pressure supplied from the manual valve.

* * * * *